United States Patent
Asai et al.

(10) Patent No.: US 10,141,587 B2
(45) Date of Patent: Nov. 27, 2018

(54) FUEL CELL SYSTEM WITH CATHODE BYPASS VALVE AND CONTROL METHOD FOR FUEL CELL SYSTEM

(71) Applicant: NISSAN MOTOR CO., LTD., Yokohama-shi, Kanagawa (JP)

(72) Inventors: Yoshitomo Asai, Kanagawa (JP); Hiroshi Takeda, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/504,740

(22) PCT Filed: Aug. 20, 2014

(86) PCT No.: PCT/JP2014/071813
§ 371 (c)(1),
(2) Date: Feb. 17, 2017

(87) PCT Pub. No.: WO2016/027335
PCT Pub. Date: Feb. 25, 2016

(65) Prior Publication Data
US 2017/0352899 A1    Dec. 7, 2017

(51) Int. Cl.
*H01M 8/04089*    (2016.01)
*H01M 8/0438*    (2016.01)
*H01M 8/04746*    (2016.01)

(52) U.S. Cl.
CPC ... *H01M 8/04104* (2013.01); *H01M 8/04395* (2013.01); *H01M 8/04432* (2013.01);
(Continued)

(58) Field of Classification Search
None
See application file for complete search history.

(56) References Cited

U.S. PATENT DOCUMENTS

| 9,755,253 | B2* | 9/2017 | Asai | H01M 8/04111 |
| 2010/0021783 | A1* | 1/2010 | Osada | H01M 8/04089 |
| | | | | 429/424 |

(Continued)

FOREIGN PATENT DOCUMENTS

| JP | 2006-107880 A | 4/2006 |
| JP | 2006-164626 A | 6/2006 |

(Continued)

*Primary Examiner* — Lucas J. O'Donnell
(74) *Attorney, Agent, or Firm* — Foley & Lardner LLP

(57) ABSTRACT

A fuel cell system includes a supply unit configured to supply cathode gas to a fuel cell, a bypass valve configured to bypass the cathode gas to be supplied to the fuel cell by the supply unit, a detection unit configured to detect a state of the cathode gas to be supplied to the fuel cell without being bypassed by the bypass valve, a pressure adjusting unit configured to adjust a pressure of the cathode gas to be supplied to the fuel cell, a calculation unit configured to calculate a target flow rate and a target pressure of the cathode gas to be supplied to the fuel cell according to an operating state of the fuel cell, an operating state control unit configured to control an operation amount of at least one of the pressure adjusting unit and the supply unit on the basis of a flow rate and the pressure of the cathode gas detected by the detection unit and the target flow rate and the target pressure calculated by the calculation unit, a bypass valve control unit configured to open and close the bypass valve on the basis of the flow rate of the cathode gas detected by the detection unit and the target flow rate calculated by the calculation unit, and a pressure compensation unit configured to compensate for the pressure of the cathode gas to be supplied to the fuel cell by increasing the at least one operation amount controlled by the operating state control unit or by decreasing an opening speed of the bypass valve when the bypass valve is opened.

7 Claims, 16 Drawing Sheets

(52) U.S. Cl.
CPC ... *H01M 8/04753* (2013.01); *H01M 8/04783* (2013.01); *H01M 2250/20* (2013.01); *Y02T 90/32* (2013.01)

(56) References Cited

U.S. PATENT DOCUMENTS

| | | | |
|---|---|---|---|
| 2010/0266920 A1* | 10/2010 | Kanie | H01M 8/04089 429/431 |
| 2011/0293972 A1* | 12/2011 | Naganuma | B60L 11/1887 429/9 |
| 2015/0030953 A1 | 1/2015 | Asai et al. | |
| 2015/0037701 A1 | 2/2015 | Asai et al. | |
| 2015/0162629 A1 | 6/2015 | Tomita et al. | |
| 2015/0349359 A1 | 12/2015 | Asai et al. | |
| 2016/0218383 A1* | 7/2016 | Hanschke | H01M 8/1018 |

FOREIGN PATENT DOCUMENTS

| | | |
|---|---|---|
| JP | 2009-123550 A | 6/2009 |
| WO | WO 2013/129521 A1 | 9/2013 |
| WO | WO 2013/187514 A1 | 12/2013 |
| WO | WO 2014/103547 A1 | 7/2014 |

\* cited by examiner

FUEL CELL SYSTEM WITH CATHODE BYPASS VALVE AND CONTROL METHOD FOR FUEL CELL SYSTEM

TECHNICAL FIELD

This invention relates to a fuel cell system for bypassing cathode gas to be supplied to a fuel cell and a control method for fuel cell system.

BACKGROUND ART

JP2009-123550A discloses a fuel cell system with a bypass flow passage for discharging cathode gas discharged from a compressor without via a fuel cell and a valve for adjusting a flow rate of the cathode gas discharged from the bypass flow passage.

SUMMARY OF INVENTION

In the fuel cell system as described above, when the valve of the bypass flow passage is opened, the cathode gas is discharged from the bypass flow passage and a pressure of the cathode gas supplied to the fuel cell escapes to outside air via the bypass flow passage.

Since the pressure of the cathode gas to be supplied to the fuel cell becomes lower than a pressure required to the fuel cell in such a situation, generated power of the fuel cell may be reduced and a differential pressure from a pressure of anode gas may temporarily exceed an allowable differential pressure.

The present invention was developed, focusing on such a problem, and aims to provide a fuel cell system for suppressing the degradation of power generation performance of a fuel cell as cathode gas supplied from a fuel cell is bypassed and a control method for fuel cell system.

According to one aspect of the present invention, a fuel cell system includes a supply unit configured to supply cathode gas to a fuel cell, a bypass valve configured to bypass the cathode gas to be supplied to the fuel cell by the supply unit, and a detection unit configured to detect a state of the cathode gas to be supplied to the fuel cell without being bypassed by the bypass valve. The fuel cell system includes a pressure adjusting unit configured to adjust a pressure of the cathode gas to be supplied to the fuel cell, a calculation unit configured to calculate a target flow rate and a target pressure of the cathode gas to be supplied to the fuel cell according to an operating state of the fuel cell, and an operating state control unit configured to control an operation amount of at least one of the pressure adjusting unit and the supply unit on the basis of a flow rate and the pressure of the cathode gas detected by the detection unit and the target flow rate and the target pressure calculated by the calculation unit. The fuel cell system includes a bypass valve control unit configured to open and close the bypass valve on the basis of the flow rate of the cathode gas detected by the detection unit and the target flow rate calculated by the calculation unit, and a pressure compensation unit configured to compensate for the pressure of the cathode gas to be supplied to the fuel cell by increasing the at least one operation amount controlled by the operating state control unit or by decreasing an opening speed of the bypass valve when the bypass valve is opened.

DESCRIPTION OF EMBODIMENTS

Hereinafter, embodiments of the present invention are described with reference to the accompanying drawings.

(First Embodiment)

Figure 1:
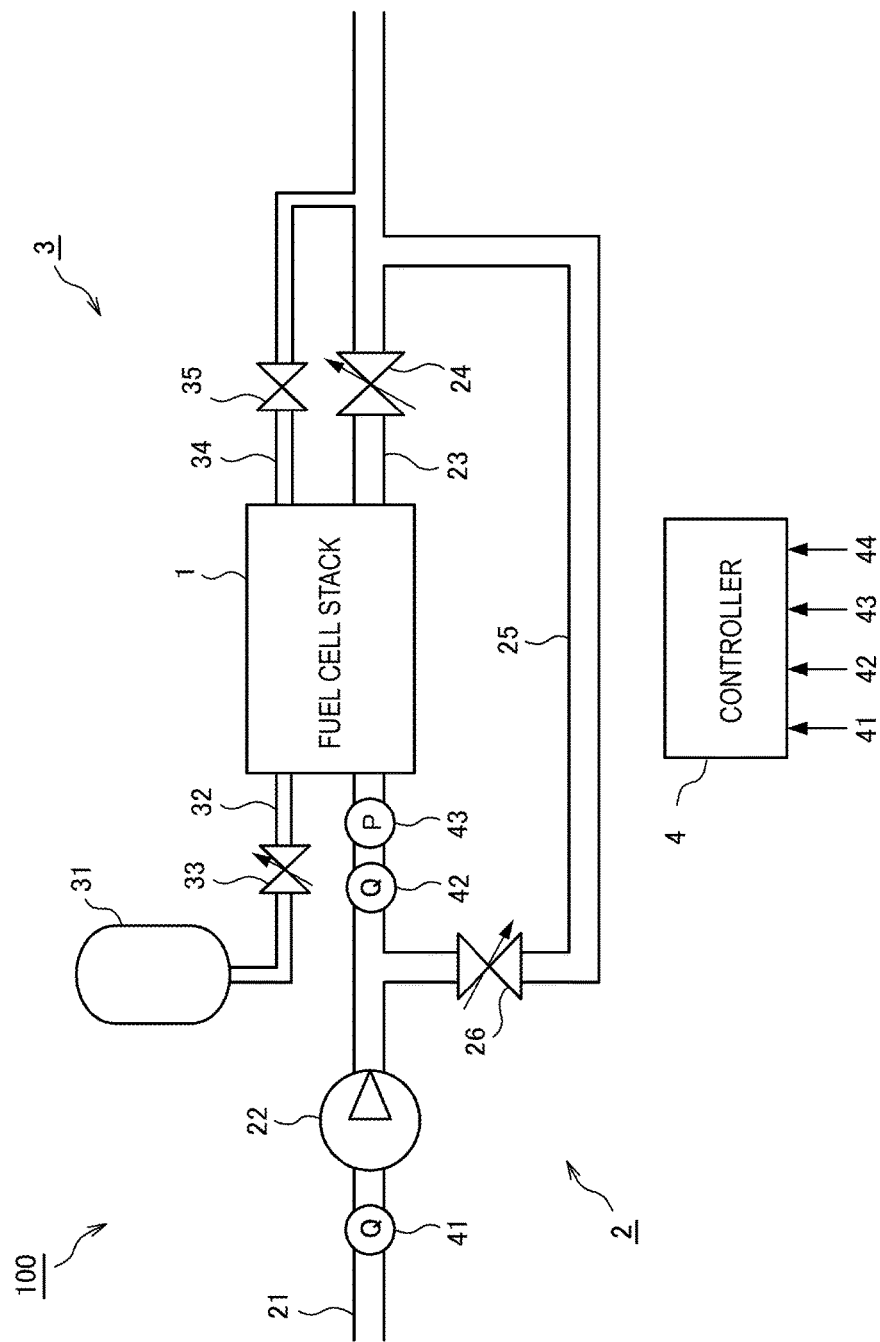
FIG. 1 is a diagram showing the configuration of a fuel cell system in a first embodiment of the present invention.

FIG. 1 is a diagram showing the configuration of a fuel cell system in a first embodiment of the present invention.

A fuel cell system 100 is a power supply system for supplying anode gas and cathode gas to a fuel cell stack 1 and causing the fuel cell stack 1 to generate power according to an electric load. The fuel cell system 100 is mounted, for example, in an electric vehicle and an electric motor for driving the vehicle is connected as the electric load to the fuel cell stack 1.

The fuel cell system 100 includes the fuel cell stack 1, a cathode gas supplying/discharging device 2, an anode gas supplying/discharging device 3 and a controller 4.

The fuel cell stack 1 is a laminated battery for generating power according to the electric load upon receiving the supply of the anode gas and the cathode gas. For example, several hundreds of fuel cells are laminated in the fuel cell stack 1.

One fuel cell laminated in the fuel cell stack 1 is composed of an anode electrode (fuel electrode), a cathode electrode (oxidant electrode) and an electrolyte membrane sandwiched between the anode electrode and the cathode electrode. In the fuel cell, the anode gas containing hydrogen in the anode electrode and cathode gas containing oxygen in the cathode electrode induce an electrochemical reaction in the electrolyte membrane to generate power. The following electrochemical reactions proceed in both anode and cathode electrodes.

Anode electrode: $2H_2 \rightarrow 4H^+ + 4e^-$ (1)

Cathode electrode: $4H^+ + 4e^- + O_2 \rightarrow 2H_2O$ (2)

By the above electrochemical reactions (1) and (2), an electromotive force is generated in the fuel cell and water is generated. Since each of the fuel cells laminated in the fuel cell stack 1 is connected in series, a total of cell voltages generated in the fuel cells becomes an output voltage (e.g. several hundreds of volts) of the fuel cell stack 1.

The cathode gas is supplied to the fuel cell stack 1 by the cathode gas supplying/discharging device 2 and the anode gas is supplied thereto by the anode gas supplying/discharging device 3.

The cathode gas supplying/discharging device 2 is a device configured to supply the cathode gas to the fuel cell stack 1 and discharge cathode off-gas discharged from the fuel cell stack 1 to outside air. The cathode off-gas contains steam generated by a power generation reaction, excess cathode gas not used in the power generation reaction and the like.

The cathode gas supplying/discharging device 2 includes a cathode gas supply passage 21, a compressor 22, a cathode gas discharge passage 23, a cathode pressure control valve 24, a bypass passage 25 and a bypass valve 26.

The cathode gas supply passage 21 is a passage for supplying the cathode gas to the fuel cell stack 1. One end of the cathode gas supply passage 21 is connected to a cathode gas inlet hole of the fuel cell stack 1 and the other end is open to communicate with outside air.

The compressor 22 is provided in the cathode gas supply passage 21. The compressor 22 constitutes a supply unit configured to take air into the cathode gas supply passage 21 from outside air and supply the air as the cathode gas to the fuel cell stack 1. The compressor 22 is controlled by the controller 4.

The cathode gas discharge passage 23 is a passage for discharging the cathode off-gas from the fuel cell stack 1. One end of the cathode gas discharge passage 23 is connected to a cathode gas outlet hole of the fuel cell stack 1 and the other end is open to communicate with outside air.

The cathode pressure control valve 24 is provided in the cathode gas discharge passage 23. The cathode pressure control valve 24 constitutes a pressure adjusting unit configured to adjust a pressure of the cathode gas to be supplied to the fuel cell stack 1. An electromagnetic valve capable of changing a valve opening degree is, for example, used as the cathode pressure control valve 24. The cathode pressure control valve 24 is controlled to open and close by the controller 4. By this open/close control, the pressure of the cathode gas to be supplied to the fuel cell stack 1 is adjusted.

The bypass passage 25 is a passage for directly discharging part of the cathode gas supplied from the compressor 22 to the cathode gas discharge passage 23 without supplying it to the fuel cell stack 1. One end of the bypass passage 25 is connected to a part of the cathode gas supply passage 21 downstream of the compressor 22 and the other end is connected to a part of the cathode gas discharge passage 23 downstream of the cathode pressure control valve 24.

The bypass valve 26 is provided in the bypass passage 25. The bypass valve 26 adjusts a flow rate of the cathode gas discharged to the bypass passage 25 out of a flow rate of the cathode gas discharged from the compressor 22. Specifically, the bypass valve 26 is for bypassing part of the cathode gas to be supplied to the fuel cell stack 1 by the compressor 22.

The bypass valve 26 is realized, for example, by an electromagnetic valve capable of changing a valve opening degree. The bypass valve 26 is controlled by the controller 4. By this open/close control, a flow rate of the cathode gas discharged to outside air from the cathode gas supply passage 21 while bypassing the fuel cell stack 1 is adjusted.

A compressor flow rate sensor 41, a stack flow rate sensor 42 and a stack pressure sensor 43 are provided in the cathode gas supply passage 21.

The compressor flow rate sensor 41 is provided in a part of the cathode gas supply passage 21 upstream of the compressor 22. The compressor flow rate sensor 41 detects the cathode gas to be sucked into the cathode gas supply passage 21 by the compressor 22.

The compressor flow rate sensor 41 outputs a detection signal indicating the detected flow rate to the controller 4. The flow rate of the cathode gas sucked by the compressor 22, i.e. the flow rate of the cathode gas discharged from the compressor 22 is referred to as a "compressor flow rate" below.

The stack flow rate sensor 42 is provided is a part of the cathode gas supply passage 21 located downstream of a part of the cathode gas supply passage 21 where the bypass passage 25 is branched off. The stack flow rate sensor 42 detects a flow rate of the cathode gas to be supplied to the fuel cell stack 1.

The stack flow rate sensor 42 outputs a detection signal indicating the detected flow rate to the controller 4. The flow rate of the cathode gas to be supplied to the fuel cell stack 1 without being bypassed by the bypass valve 26 is referred to as a "stack flow rate" below.

The stack pressure sensor 43 is provided in the part of the cathode gas supply passage 21 located downstream of the part of the cathode gas supply passage 21 where the bypass passage 25 is branched off. The stack pressure sensor 43 detects a pressure of the cathode gas to be supplied to the cathode gas inlet hole of the fuel cell stack 1.

The stack pressure sensor 43 outputs a detection signal indicating the detected pressure to the controller 4. The pressure of the cathode gas to be supplied to the fuel cell stack 1 is referred to as a "stack pressure" below.

It should be noted that the stack flow rate sensor 42 and the stack pressure sensor 43 constitute a detection unit configured to detect states of the cathode gas to be supplied to the fuel cell stack 1 without being bypassed by the bypass valve 26.

The anode gas supplying/discharging device 3 is a device configured to supply the anode gas to the fuel cell stack 1 and discharge anode off-gas from the fuel cell stack 1. The anode off-gas contains stream generated in the power generation reaction, nitrogen gas permeating through the electrolyte membranes from a cathode gas flow passage in the fuel cell stack 1 and the like besides excess anode gas not used in the power generation reaction.

The anode gas supplying/discharging device 3 includes a high-pressure tank 31, an anode gas supply passage 32, an anode pressure control valve 33, an anode gas discharge passage 34 and a purge valve 35.

The high-pressure tank 31 stores the anode gas to be supplied to the fuel cell stack 1 in a high-pressure state.

The anode gas supply passage 32 is a passage for supplying the anode gas from the high-pressure tank 31 to the fuel cell stack 1. One end of the anode gas supply passage 32 is connected to the high-pressure tank 31 and the other end is connected to an anode gas inlet hole of the fuel cell stack 1.

The anode pressure control valve 33 is provided in the anode gas supply passage 32. The anode pressure control valve 33 is controlled to open and close by the controller 4. By this open/close control, a pressure of the anode gas to be supplied to the fuel cell stack 1 is adjusted.

The anode gas discharge passage 34 is a passage for discharging the anode off-gas from the fuel cell stack 1. One end of the anode gas discharge passage 34 is connected to an anode gas outlet hole of the fuel cell stack 1 and the other is connected to a part of the cathode gas discharge passage 23 located downstream of a part of the cathode gas discharge passage 23 where the bypass passage 25 joins.

The purge valve 35 is provided in the anode gas discharge passage 34. The purge valve 35 is controlled to open and close by the controller 4. By this open/close control, a flow rate of the anode off-gas discharged from the fuel cell stack 1 is adjusted.

The anode off-gas discharged from the purge valve 35 is diluted by the cathode off-gas flowing in the cathode gas discharge passage 23 and discharged to outside air. Thus, a hydrogen concentration in discharged gas to be discharged to outside air from the cathode gas discharge passage 23 can be maintained, for example, at 4% or lower.

The controller 4 is configured by a microcomputer including a central processing unit (CPU), a read-only memory (ROM), a random access memory (RAM) and an input/output interface (I/O interface).

To the controller 4 are input a detection signal from an atmospheric pressure sensor 44 for detecting an outside air pressure besides those from the compressor flow rate sensor 41, the stack flow rate sensor 42 and the stack pressure sensor 43. Signals of other sensors including an accelerator stroke sensor for detecting a depressed amount of an accelerator pedal, a device for measuring an internal resistance of the fuel cell stack 1 and sensors for detecting a rotation speed and a torque of the compressor 22 are input to the controller 4.

The controller 4 controls the compressor 22, the cathode pressure control valve 24, the bypass valve 26, the anode pressure control valve 33 and the purge valve 35 using detection signals from these various sensors and command signals of various control components.

In the present embodiment, the controller 4 calculates target values of the flow rate and pressure of the cathode gas to be supplied to the fuel cell stack 1 on the basis of required power required to the fuel cell stack 1 from the electric load. The target values of the flow rate and pressure of the cathode gas to be supplied to the fuel cell stack 1 are referred to as a "stack target flow rate" and a "stack target pressure" below.

For example, the controller 4 increases the stack target flow rate and the stack target pressure as the depressed amount of the accelerator pedal increases since required power of the electric motor increases.

Further, if the internal resistance correlated with a degree of wetness of the fuel cell stack 1 is smaller than a reference value determined in advance, the controller 4 increases the stack target flow rate. Since a discharge amount of steam carried out from the fuel cell stack 1 by the cathode gas increases in this way, the occurrence of water clogging in the fuel cell stack 1, so-called flooding, can be suppressed.

On the other hand, if the internal resistance of the fuel cell stack 1 is larger than the reference value, the controller 4 increases the stack target pressure. Since the discharge amount of steam carried out from the fuel cell stack 1 by the cathode gas decreases in this way, it can be avoided that the electrolyte membranes of the fuel cells become excessively dry and are degraded.

As just described, the stack target flow rate and the stack target pressure are set by requests such as a power generation request based on the required power of the electric load, a wet/dry request based on a wet/dry state of the electrolyte membranes, an electrolyte membrane protection request based on differential pressures between the cathode electrodes and anode electrodes and excessive temperature prevention requests of components. Specifically, the stack target flow rate and the stack target pressure are changed according to operating states such as a power generation state, a wet/dry state, an internal resistance state and a temperature state of the fuel cell stack 1.

Further, in the present embodiment, the controller 4 opens the bypass valve 26 by increasing an opening degree of the bypass valve 26 if the flow rate of the cathode gas discharged from the compressor 22 becomes larger than the stack target flow rate.

For example, when the required power of the electric motor decreases, the controller 4 opens the bypass valve 26 so that the hydrogen concentration in the discharged gas does not exceed a predetermined concentration. In this way, the stack flow rate can be reduced to a flow rate necessary for power generation while a discharged amount of the cathode gas for diluting hydrogen discharged from the fuel cell stack 1 is ensured.

Alternatively, if the rotation speed of the compressor 22 is increased to prevent the occurrence of a surge in the compressor 22, the controller 4 opens the bypass valve 26 and discharges the cathode gas at a flow rate corresponding to the rotation speed increase to outside air. It should be noted that the surge is a phenomenon in which an air flow rate and an air pressure cyclically fluctuate in a centrifugal air compressor.

Figure 2:
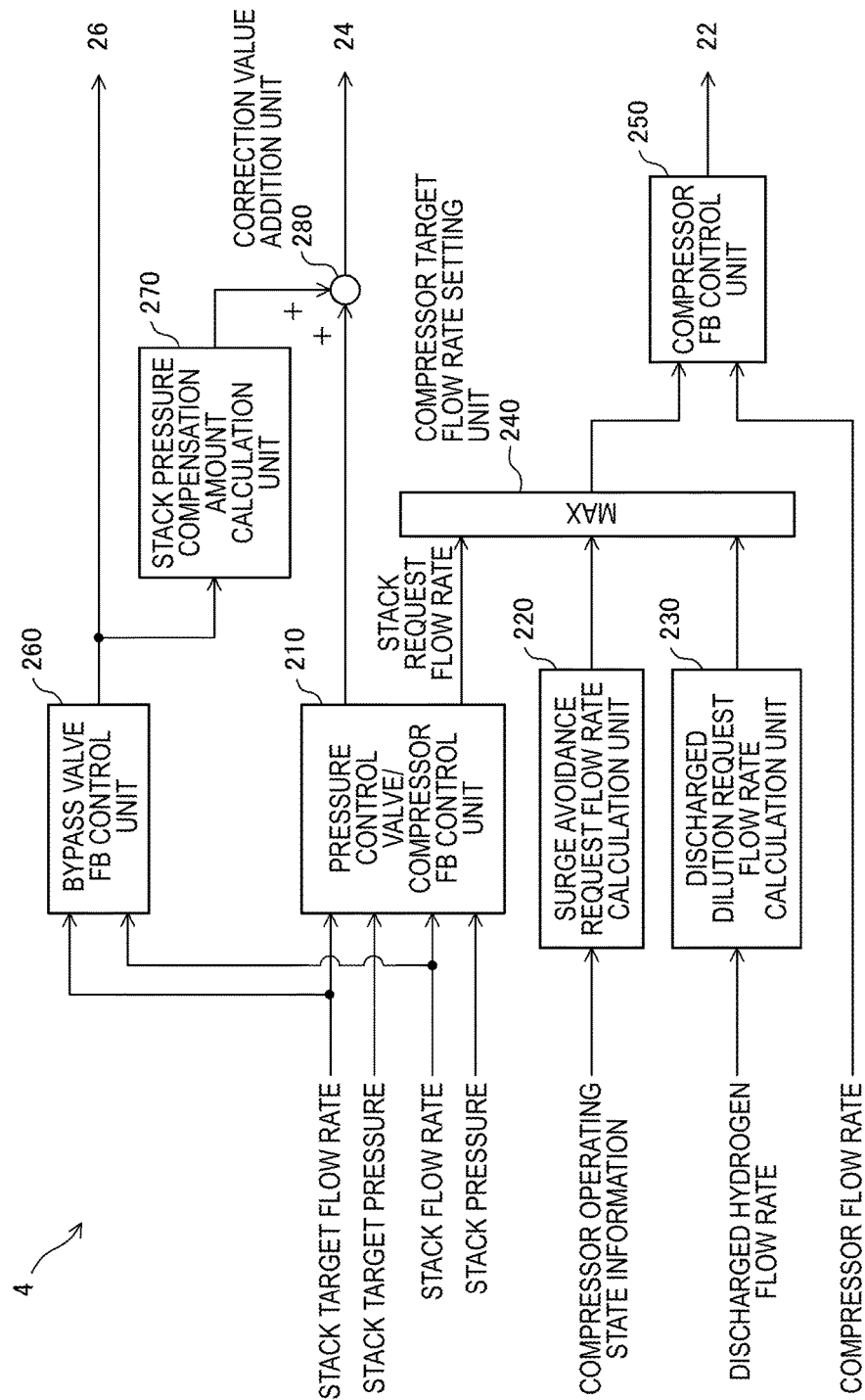
FIG. 2 is a block diagram showing a functional configuration of a controller configured to control the fuel cell system, FIG. 3 are time charts showing an opening degree of a cathode pressure control valve for compensating for a pressure of cathode gas to be supplied to a fuel cell stack when a bypass valve is opened.

FIG. 2 is a block diagram showing a functional configuration of the controller 4 configured to control the fuel cell system 100.

The controller 4 includes a pressure control valve/compressor FB control unit 210, a surge avoidance request flow rate calculation unit 220, a discharged hydrogen dilution request flow rate calculation unit 230, a compressor target flow rate setting unit 240 and a compressor FB control unit 250. Further, the controller 4 includes a bypass valve FB control unit 260, a stack pressure compensation amount calculation unit 270 and a correction value addition unit 280.

The pressure control valve/compressor FB control unit 210 feedback-controls an operation amount of the compressor 22 and an operation amount of the cathode pressure control valve 24 on the basis of the stack target flow rate and the stack target pressure described above and the detected stack flow rate and stack pressure.

In the present embodiment, the stack flow rate is detected by the stack flow rate sensor 42 and the stack pressure is detected by the stack pressure sensor 43. The operation amount of the compressor 22 is a flow rate of the cathode gas necessary for the fuel cell stack 1 and referred to as a "stack request flow rate" below.

The operation amount of the cathode pressure control valve 24 is an opening degree command value for supplying a pressure of the cathode gas necessary for the fuel cell stack 1 by the cathode pressure control valve 24. An opening of the cathode pressure control valve 24 increases as the opening degree command value of the cathode pressure control valve 24 increases, and the opening of the cathode pressure control valve 24 decreases as the opening degree command value of the cathode pressure control valve 24 decreases.

The pressure control valve/compressor FB control unit 210 calculates the stack request flow rate of the compressor 22 and the opening degree command value of the cathode pressure control valve 24 such that the stack flow rate and the stack pressure respectively converge to the stack target flow rate and the stack target pressure.

In the present embodiment, the pressure control valve/compressor FB control unit 210 calculates the stack request flow rate of the compressor 22 and the opening degree command value of the cathode pressure control valve 24 on the basis of a two-input two-output control model for controlling the stack flow rate and the stack pressure on the basis of the stack target flow rate and the stack target pressure.

The two-input two-output control model is obtained by modeling a cathode gas flow passage from the compressor 22 to the cathode pressure control valve 24 via the fuel cell stack 1.

For example, in the two-input two-output control model, operation characteristics of the compressor 22, inlet- and outlet-side manifolds in the fuel cell stack 1 and the like are considered. The stack flow rate and the stack pressure, which are state quantities of the cathode gas to be supplied to the fuel cell stack 1, are calculated on the basis of a volumetric flow rate of the cathode gas flowing into the inlet-side manifold from the compressor 22, a volumetric flow rate of the cathode gas to be output to the outlet-side manifold by the cathode pressure control valve 24 and the like.

The two-input two-output control model is expressed by determinant equations as follows.

[Equations 1]

$$\frac{d}{dt}x = Ax + Bu + E\gamma \quad (3)$$
$$y = Cx$$

Here, a matrix x is a parameter indicating the state quantities of the cathode gas in the cathode gas flow passage from the compressor 22 to the fuel cell stack 1. A matrix u is a parameter indicating operation amounts for operating the state quantities of the cathode gas and includes the stack request flow rate of the compressor 22 and the opening degree command value of the cathode pressure control valve 24. A matrix γ is target values of the state quantities of the cathode gas and includes the stack target flow rate and the stack target pressure. A matrix y is outputs of the state quantities of the cathode gas desired to be calculated and includes the stack flow rate and the stack pressure.

Further, matrices A, B, C and E are constants of specific heat and the like of the cathode gas and constants determined by the shape of the cathode gas flow passage from the compressor 22 to the cathode pressure control valve 24 via the fuel cell stack 1, the specifications of the compressor 22 and the like. Specifically, the matrices A, B, C and E are determined by a volume of the cathode gas flow passage, a pressure loss coefficient and the like.

As shown in Equations (3), the stack request flow rate of the compressor 22 and the opening degree command value of the cathode pressure control valve 24 are calculated using deviations dx/dt of the cathode gas state quantities and outputs y of the cathode gas state quantities.

Specifically, the matrix x, which is the state quantities of the cathode gas, is determined by the stack request flow rate of the compressor 22 and the opening degree command value of the cathode pressure control valve 24 in the matrix u and the stack target flow rate and the stack target pressure in the matrix γ, and the stack flow rate and the stack pressure in the matrix y are calculated by this matrix x. Thus, the stack request flow rate and the opening degree command value of the cathode pressure control valve 24 are obtained by inputting detection values of the stack flow rate and the stack pressure, the stack target flow rate and the stack target pressure into Equations (3).

As just described, the pressure control valve/compressor FB control unit 210 calculates the stack request flow rate and the opening degree command value in the matrix u, which change according to changes of the cathode gas state quantities with time, using Equations (3). In this way, the stack flow rate and the stack pressure can be properly converged to the respective target values in accordance with operation characteristics of the compressor 22 and the cathode pressure control valve 24 and an internal structure of the fuel cell stack 1 when the stack target flow rate and the stack target pressure change.

The pressure control valve/compressor FB control unit 210 outputs the opening degree command value of the cathode pressure control valve 24 to the correction value addition unit 280 and outputs the stack request flow rate of the compressor 22 to the compressor target flow rate setting unit 240.

The surge avoidance request flow rate calculation unit 220 calculates a flow rate of the cathode gas discharged from the compressor 22 on the basis of compressor operating state information such that a surge does not occur in the compressor 22. The flow rate of the cathode gas calculated by the surge avoidance request flow rate calculation unit 220 is referred to as a "surge avoidance request flow rate" below.

The compressor operating state information includes the rotation speed of the compressor 22 and an inlet pressure and an outlet pressure of the compressor 22. For example, the inlet pressure of the compressor 22 is calculated on the basis of a value detected by the atmospheric pressure sensor 44. The outlet pressure of the compressor 22 is calculated on the basis of a value detected by the stack pressure sensor 43. It should be noted that pressure sensors may be respectively provided in parts of the cathode gas supply passage 21 upstream and downstream of the compressor 22, and detection signals output from these pressure sensors may be used as the inlet pressure and the outlet pressure of the compressor 22.

In the present embodiment, a surge avoidance map indicating an operation region of the compressor 22 where a surge occurs is stored in advance in the surge avoidance request flow rate calculation unit 220. The surge avoidance map is set based on the specifications of the compressor 22 and the like.

When obtaining the compressor operation state information, the surge avoidance request flow rate calculation unit 220 refers to the surge avoidance map and determines whether or not an operation point specified by the rotation speed, the inlet pressure and the outlet pressure of the compressor 22 lies in the region where a surge occurs. If the operation point of the compressor 22 lies in the region where a surge occurs, the surge avoidance request flow rate calculation unit 220 increases the surge avoidance request flow rate to shift the operation point to a region where no surge occurs.

In this way, the surge avoidance request flow rate calculation unit 220 calculates the surge avoidance request flow rate and outputs the calculated surge avoidance request flow rate to the compressor target flow rate setting unit 240.

The discharged hydrogen dilution request flow rate calculation unit 230 calculates a flow rate of the cathode gas discharged from the compressor 22 on the basis of a discharged hydrogen flow rate of the purge valve 35 such that the hydrogen concentration in the gas discharged from the cathode gas discharge passage 23 is not higher than a predetermined concentration.

The flow rate of the cathode gas calculated by the discharged hydrogen dilution request flow rate calculation unit 230 is referred to as a "discharged hydrogen dilution request flow rate" below. Further, the discharged hydrogen flow rate of the purge valve 35 is a flow rate of the anode off-gas discharged from the purge valve 35 and, for example, calculated on the basis of an opening degree of the purge valve 35.

In the present embodiment, a dilution flow rate map indicating a relationship between the discharged hydrogen flow rate of the purge valve 35 and the discharged hydrogen dilution request flow rate is stored in the discharged hydrogen dilution request flow rate calculation unit 230. When obtaining the discharged hydrogen flow rate, the discharged hydrogen dilution request flow rate calculation unit 230 refers to the dilution flow rate map and calculates the discharged hydrogen dilution request flow rate corresponding to that discharged hydrogen flow rate.

For example, the discharged hydrogen dilution request flow rate calculation unit 230 monotonously increases the discharged hydrogen dilution request flow rate as the discharged hydrogen flow rate increases. The discharged hydrogen dilution request flow rate calculation unit 230 outputs the discharged hydrogen dilution request flow rate to the compressor target flow rate setting unit 240.

The compressor target flow rate setting unit 240 sets the largest value out of the stack request flow rate, the surge avoidance request flow rate and the discharged hydrogen dilution request flow rate as the compressor target flow rate and outputs that compressor target flow rate to the compressor FB control unit 250.

The compressor FB control unit 250 feedback-controls a torque command value of the compressor 22 on the basis of the compressor target flow rate and the compressor flow rate. It should be noted that the compressor flow rate is detected by the compressor flow rate sensor 41.

Specifically, the compressor FB control unit 250 calculates the torque command value of the compressor 22 such that the compressor flow rate converges to the compressor target flow rate. The compressor FB control unit 250 outputs that torque command value to the compressor 22.

For example, the compressor FB control unit 250 increases the flow rate of the cathode gas discharged from the compressor 22 by increasing the torque command value of the compressor 22 when the compressor target flow rate is larger than the compressor flow rate.

Thus, the flow rate of the cathode gas discharged from the compressor 22 is controlled on the basis of the stack request flow rate with the bypass valve 26 closed when the stack request flow rate is larger than the surge avoidance request flow rate and the discharged hydrogen dilution request flow rate.

Further, depending on operating states of the fuel cell stack 1, the surge avoidance request flow rate or the discharged hydrogen dilution request flow rate may become larger than the stack request flow rate and the flow rate of the cathode gas discharged from the compressor 22 may be increased according to these request flow rates. In such a situation, the cathode gas is supplied to the fuel cell stack 1 at an excessive flow rate. As a countermeasure against this, the bypass valve FB control unit 260 is provided.

The bypass valve FB control unit 260 constitutes a bypass valve control unit configured to feedback-control the opening and closing of the bypass valve 26 on the basis of the stack target flow rate and the detected stack flow rate. Specifically, the bypass valve FB control unit 260 calculates an opening degree command value of the bypass valve 26 such that the stack flow rate converges to the stack target flow rate.

For example, when the stack target flow rate is larger than the stack flow rate, the bypass valve FB control unit 260 increases the flow rate of the cathode gas discharged to the bypass passage 25 from the compressor 22 by increasing the opening degree command value of the bypass valve 26.

Since this causes part of the cathode gas to be supplied to the fuel cell stack 1 to be bypassed, it can be prevented that the cathode gas continues to be supplied to the fuel cell stack 1 at a flow rate larger than the stack request flow rate. Thus, a situation where the electrolyte membranes of the fuel cells become excessively dry and are degraded due to excessive supply of the cathode gas to the fuel cell stack 1 can be avoided.

However, when the bypass valve 26 is opened, the stack pressure of the cathode gas to be supplied to the fuel cell stack 1 escapes from the bypass passage 25 to outside air via the cathode gas discharge passage 23. In response to this reduction of the stack pressure, a feedback control requiring a given time for convergence to the stack target pressure is executed in the pressure control valve/compressor FB control unit 210. Thus, the stack pressure becomes too low.

Such a reduction of the stack pressure may reduce the generated power of the fuel cell stack 1 and cause an inter-electrode differential pressure between a pressure on the cathode electrode side and a pressure on the anode electrode side in the fuel cell stack 1 to temporarily exceed an allowable pressure of the fuel cells to degrade the durability of the fuel cells and deteriorate power generation characteristics.

Accordingly, in the present embodiment, the controller 4 increases a change amount in closing the cathode pressure control valve 24 when the bypass valve 26 is opened. Since this causes the stack pressure to increase, a reduction of the stack pressure caused when the bypass valve 26 is opened can be canceled out.

Specifically, a reduction of the stack pressure is compensated for by the stack pressure compensation amount calculation unit 270 and the correction value addition unit 280 shown in FIG. 2.

The stack pressure compensation amount calculation unit 270 calculates a compensation amount for compensating for a reduction of the stack pressure caused when the bypass valve 26 is opened, using a pressure compensation control model.

The pressure compensation control model is a control model for controlling the cathode gas state quantities in a configuration in which the bypass passage 25 and the bypass valve 26 are added to the aforementioned two-input two-output control model and is expressed by determinant equations as follows.

[Equations 2]

$$\frac{d}{dt}x = Ax + Bu + E\gamma + Gd_{byps} \quad (4)$$
$$y = Cx$$

Here, a matrix $Gd_{byps}$ is a parameter indicating the state quantities of the cathode gas to be supplied from the compressor 22 to the bypass passage 25. Other matrices are the same as in Equations (3).

A matrix G is a constant determined based on the shape of the cathode gas flow passage up to the bypass valve 26 in the bypass passage 25 branched off from the cathode gas supply passage 21, i.e. a pressure loss, and the like. The matrix $d_{byps}$ is a parameter indicating operation amounts of the bypass valve 26 and includes the opening degree command value of the bypass valve 26.

As shown in Equations (4), the stack flow rate and the stack pressure, which are the state quantities of the cathode gas to be supplied to the fuel cell stack 1, change according to the opening degree of the bypass valve 26 by adding the matrix $Gd_{byps}$ to Equations (3). As just described, the pressure compensation control model is a control model, also taking into account a reduction of the stack pressure when the bypass valve 26 is opened.

The matrix $Gd_{byps}$ acts as disturbance when the stack flow rate and the stack pressure are respectively converged to the stack target flow rate and the stack target pressure. Thus, the opening degree command value of the cathode pressure control valve 24 needs to be calculated to cancel out the state quantities of the cathode gas expressed by the matrix $Gd_{byps}$ as in the following equation in order to compensate for a reduction of the stack pressure when the bypass valve 26 is opened.

[Equations 3]

$$\frac{d}{dt}x = Ax + B\left(u - \frac{G}{B}d_{byps}\right) + E\gamma + Gd_{byps} \quad (5)$$
$$y = Cx$$

Since a calculation result of the pressure control valve/compressor FB control unit 210 is corrected in the present embodiment, the matrix u is expressed as follows.

[Equation 4]

$$u = Fx + V\gamma + \mu \quad (6)$$

Here, the sum (Fx and Vγ) of a matrix Fx and a matrix Vγ is determined on the basis of the opening degree command value of the cathode pressure control valve 24 and the stack request flow rate of the compressor 22 calculated by the pressure control valve/compressor FB control unit 210. Further, a matrix μ is a parameter for canceling out the matrix $Gd_{byps}$ acting as disturbance and includes an opening degree correction value for correcting the opening degree command value of the cathode pressure control valve 24.

Determinant Equation (7) can be derived by substituting Equation (6) into the matrix u in Determinant Equation (5).

[Equation 5]

$$\frac{d}{dt}x = Ax + B(Fx + V\gamma + \mu) + E\gamma + Gd_{byps} \quad (7)$$
$$= (Ax + BF)x + (BV + E)\gamma + B\mu + Gd_{byps}$$

Here, the matrix $Gd_{byps}$ corresponding to disturbance can be canceled out if Determinant Equation (8) holds in Determinant Equation (7).

[Equation 6]

$$B\mu + Gd_{byps} = 0 \quad (8)$$

Thus, the matrix μ can be derived as in the following equation by dividing both sides of Determinant Equation (8) by an inverse matrix $B^{-1}$ of the matrix B.

[Equation 7]

$$\mu = -B^{-1}Gd_{byps} \quad (8)$$

The opening degree correction value of the cathode pressure control valve 24 is determined on the basis of parameters included in the matrix μ by substituting the opening degree command value of the bypass valve 26 into the matrix $d_{byps}$ in Determinant Equation (9).

Thus, the stack pressure compensation amount calculation unit 270 calculates the opening degree correction value of the cathode pressure control valve 24 by substituting the opening degree command value output from the bypass valve FB control unit 260 into the matrix $d_{byps}$ in Determinant Equation (9) using Determinant Equation (9). In this way, the stack pressure compensation amount calculation unit 270 calculates the opening degree correction value taking into account influences by the operation of the bypass valve 26 on the basis of the opening degree command value of the bypass valve 26.

The correction value addition unit 280 adds the opening degree correction value from the stack pressure compensation amount calculation unit 270 to the opening degree command value output from the pressure control valve/compressor FB control unit 210. In this way, the opening degree command value of the cathode pressure control valve 24 controlled by the pressure control valve/compressor FB control unit 210 can be increased.

The correction value addition unit 280 outputs a value obtained by adding the opening degree correction value to the opening degree command value of the cathode pressure control valve 24 calculated by the pressure control valve/compressor FB control unit 210 as a new opening degree command value to the cathode pressure control valve 24.

As just described, the stack pressure compensation amount calculation unit 270 and the correction value addition unit 280 constitute a pressure compensation unit configured to compensate for the stack pressure by increasing the operation amount calculated by the pressure control valve/compressor FB control unit 210 when the bypass valve 26 is opened.

Figure 3:
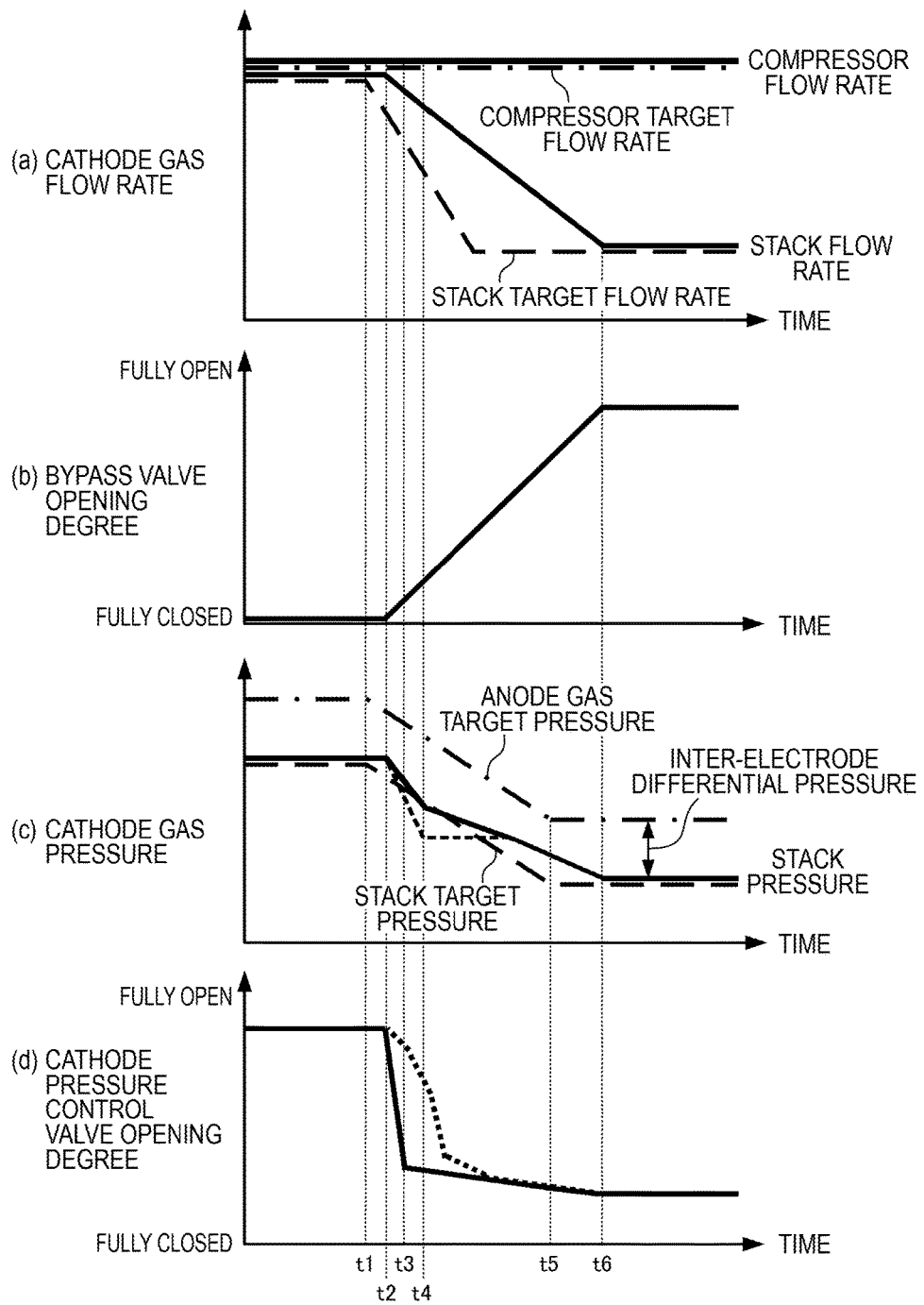

FIG. 3 are time charts showing a control technique of the cathode pressure control valve 24 in the present embodiment.

FIG. 3(a) is a chart showing the flow rate of the cathode gas. FIG. 3(b) is a chart showing the opening degree of the bypass valve 26. FIG. 3(c) is a chart showing the stack pressure of the cathode gas to be supplied to the fuel cell stack 1. FIG. 3(*d*) is a chart showing the opening degree of the cathode pressure control valve 24. Horizontal axes of FIGS. 3(*a*) to 3(*d*) are time axes common to each other.

In FIG. 3(*a*), the compressor flow rate, which is the flow rate of the cathode gas discharged from the compressor 22, is shown by a solid line and the compressor target flow rate is shown by a dashed-dotted line. Further, in FIG. 3(*a*), the stack flow rate, which is the flow rate of the cathode gas to be supplied to the fuel cell stack 1, is shown by a solid line and the stack target flow rate is shown by a broken line.

In FIG. 3(*c*), the stack pressure when the opening degree command value of the cathode pressure control valve 24 was corrected by the opening degree correction value of the stack pressure compensation amount calculation unit 270 is shown by a solid line and the stack pressure when no correction was made is shown by a dotted line. Further, in FIG. 3(*c*), the stack target pressure is shown by a broken line and a target pressure of the anode gas is shown by a dashed-dotted line.

In FIG. 3(*d*), the opening degree of the cathode pressure control valve 24 when a correction was made by the opening degree correction value of the stack pressure compensation amount calculation unit 270 is shown by a solid line and the opening degree of the cathode pressure control valve 24 when no correction was made is shown by a dotted line.

It should be noted that the lines are shown not to overlap in FIGS. 3(*a*) and 3(*c*) to make the drawings easily visible.

Before time t1, the compressor 22 is controlled not by the discharged hydrogen dilution request and the surge avoidance request, but by the stack power generation request. Thus, the compressor target flow rate and the stack target flow rate are set at the same value as shown in FIG. 3(*a*) and the bypass valve 26 is closed as shown in FIG. 3(*b*).

At time t1, as shown in FIGS. 3(*a*) and 3(*c*), the required power required to the fuel cell stack 1 is reduced and a stack target flow rate and the stack target pressure are reduced. Thus, a deviation between the stack flow rate and the stack target flow rate increases and a deviation between the stack pressure and the stack target pressure also increases.

Further, as the stack target pressure is reduced, the anode gas target pressure is also reduced so that the inter-electrode differential pressure between the anode gas pressure and the cathode gas pressure in the fuel cell stack 1 does not exceed the allowable pressure of the electrolyte membranes. In this case, less current is taken out from the fuel cell stack 1 since the required power is reduced. Thus, the amount of consumption of the anode gas in the fuel cell stack 1 decreases. As a result, the anode gas pressure in the fuel cell stack 1 moderately decreases to become lower than the anode gas target pressure.

It should be noted that since the discharged hydrogen dilution request or the surge avoidance request is not met if the compressor flow rate is reduced as the required power is reduced, the compressor target flow rate is maintained to be constant by these requests here.

At time t2, as shown in FIG. 3(*b*), the bypass valve 26 is opened by the bypass valve FB control unit 260 to reduce the deviation between the stack flow rate and the stack target flow rate. Associated with this, the pressure of the cathode gas to be supplied to the fuel cell stack 1 escapes to outside air from the bypass passage 25.

At this time, as shown in FIG. 3(*d*), the cathode pressure control valve 24 is closed by the pressure control valve/compressor FB control unit 210 such that both the stack flow rate and the stack pressure converge to the stack target flow rate and the stack target pressure.

If the cathode pressure control valve 22 is controlled only by the pressure control valve/compressor FB control unit 210, the cathode pressure control valve 24 is moderately closed as shown by the dotted line of FIG. 3(*d*) even if the stack pressure decreases since the stack pressure is adjusted by a feedback control. Thus, as shown by the dotted line of FIG. 3(*c*), the stack pressure becomes drastically lower than the stack target pressure. As a result, the inter-electrode differential pressure between the anode gas pressure and the cathode gas pressure in the fuel cell stack 1 becomes larger than the allowable pressure of the fuel cells and the durability of the fuel cells is degraded.

In contrast, in the present embodiment, the stack pressure compensation amount calculation unit 270 calculates the opening degree correction value of the cathode pressure control valve 24 taking into account influences by the operation of the bypass valve 26 in advance on the basis of the opening degree of the bypass valve 26, and the correction value addition unit 280 adds that opening degree correction value to the opening degree command value calculated by the pressure control valve/compressor FB control unit 210. Thus, when the bypass valve 26 is opened, a reduction of the opening degree command value calculated by the pressure control valve/compressor FB control unit 210 is increased.

In this way, as shown by the solid line of FIG. 3(*d*), the cathode pressure control valve 24 is quickly closed as compared to the case where the cathode pressure control valve 24 is closed by the pressure control valve/compressor FB control unit 210.

Since the stack pressure quickly increases by quickly closing the cathode pressure control valve 24 at an opening timing of the bypass valve 26 in this way, a reduction of the stack pressure due to the escape of the cathode gas pressure to outside air through the bypass passage 25 can be compensated for.

At time t3, the opening degree correction value of the cathode pressure control valve 24 becomes smaller and the cathode pressure control valve 24 is gradually closed.

At time t4, as shown by the solid line of FIG. 3(*c*), a reduction of the stack pressure from the stack target pressure becomes smaller by quickly closing the cathode pressure control valve 24 as compared to the case of controlling the cathode pressure control valve 24 by the pressure control valve/compressor FB control unit 210.

Thus, the differential pressure between the anode gas pressure and the cathode gas pressure in the fuel cell stack 1 is suppressed to be lower than the allowable pressure of the electrolyte membranes, wherefore the degradation of the fuel cells can be suppressed.

Thereafter, at time t5, the stack target pressure becomes constant as shown in FIG. 3(*c*). At time t6, the stack flow rate and the stack pressure respectively converge to the stack target flow rate and the stack target pressure as shown in FIGS. 3(*a*) and 3(*c*) and the opening degrees of the bypass valve 26 and the cathode pressure control valve 24 are respectively maintained to be constant as shown in FIGS. 3(*b*) and 3(*d*).

By increasing a reduction of the opening degree command value of the cathode pressure control valve 24 in this way in opening the bypass valve 26, a reduction of the pressure of the cathode gas to be supplied to the fuel cell stack 1 can be compensated for. Thus, it can be suppressed that the differential pressure between the anode gas pressure and the cathode gas pressure in the fuel cell stack 1 becomes excessively large to degrade the durability of the fuel cells.

It should be noted that although an example of calculating the compensation amount of the stack pressure using the pressure compensation control model has been described in the present embodiment, there is no limitation to this.

For example, when obtaining the opening degree command value of the bypass valve 26 from the bypass valve FB control unit 260, the stack pressure compensation amount calculation unit 270 may refer to a correction map determined in advance and calculate the opening degree correction value corresponding to that opening degree command value.

In this case, since the correction map is set such that the opening degree correction value of the cathode pressure control valve 24 increases as the opening degree command value of the bypass valve 26 increases since the stack pressure tends to decrease. In this way, a reduction of the stack pressure when the bypass valve 26 is opened can be compensated for by a simple configuration.

It should be noted that the matrix G shown in Equation (9) includes the temperature of the cathode gas passing through the bypass passage 25 and the pressure of the cathode gas upstream of the bypass valve 26 as parameters. Thus, the opening degree correction value of the cathode pressure control valve 24 is desirably changed according to these parameters.

Figure 4:
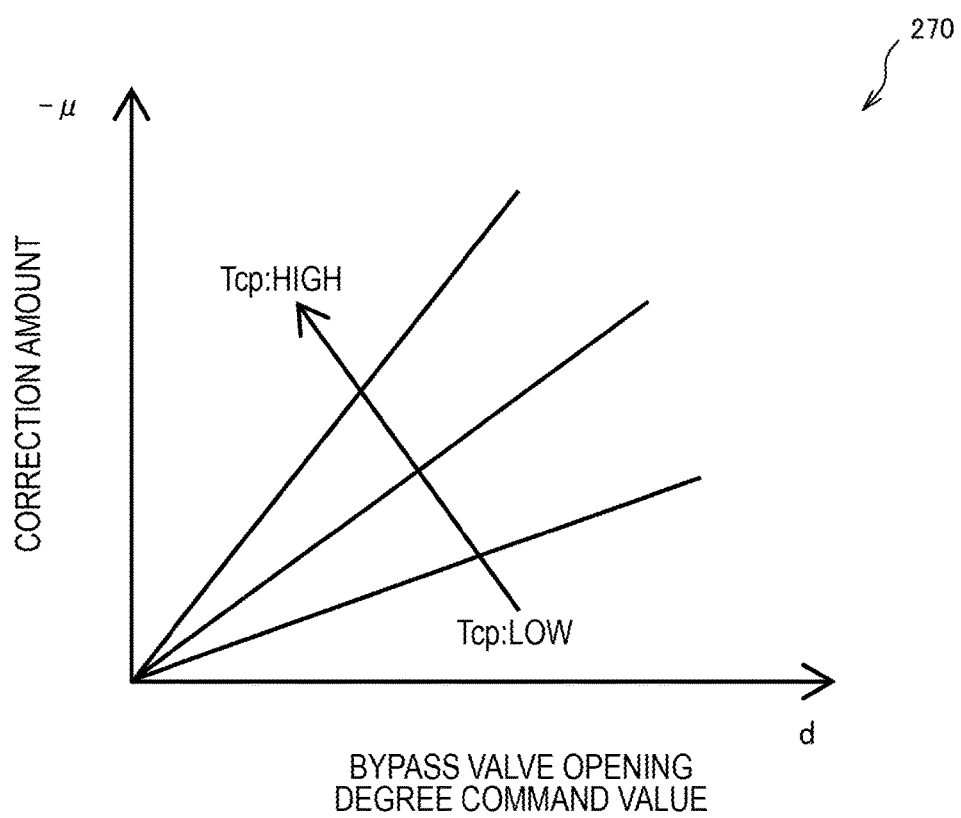
FIG. 4 is a diagram showing a temperature correction map for correcting an increase amount of a cathode pressure control valve command value according to a temperature of the cathode gas passing through the bypass valve.
Figure 5:
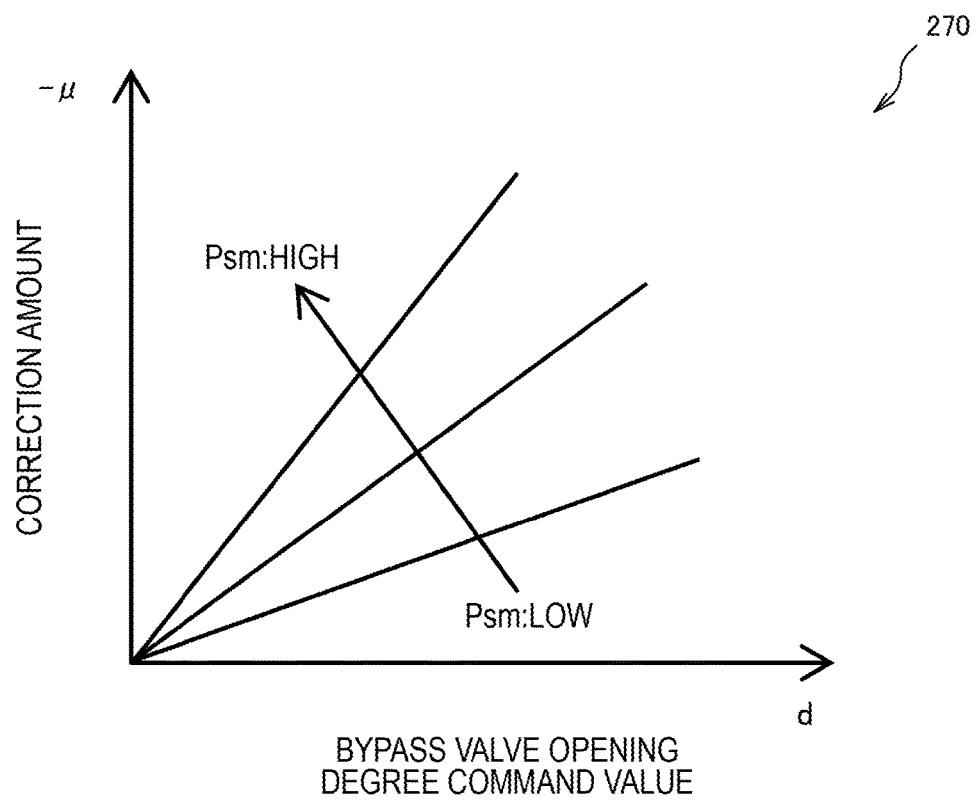
FIG. 5 is a diagram showing a pressure correction map for correcting the increase amount of the cathode pressure control valve command value according to a pressure of the cathode gas upstream of the bypass valve, FIG. 6 are time charts showing a technique of a calculation process for correcting an opening degree command value of the cathode pressure control valve.

Accordingly, the stack pressure compensation amount calculation unit 270 may correct the opening degree correction value of the cathode pressure control valve 24 according to the temperature of the cathode gas passing through the bypass passage 25 and the pressure of the cathode gas upstream of the bypass valve 26 as shown in FIGS. 4 and 5.

FIG. 4 is a graph showing a temperature correction map in which a correction amount of the cathode pressure control valve 24 is set for each temperature Tcp of the cathode gas passing through the bypass valve 26.

Here, a horizontal axis represents an opening degree command value d of the bypass valve 26 and a vertical axis represents a correction amount for correcting the operation amount of the cathode pressure control valve 24. It should be noted that a value obtained by reversing the sign of the correction amount is an opening degree correction value μ of the cathode pressure control valve 24.

In the temperature correction map, the correction amount of the cathode pressure control valve 24 monotonously increases as the opening degree command value d of the bypass valve 26 increases. Specifically, the opening degree correction value μ of the cathode pressure control valve 24 monotonously decreases from zero as the opening degree command value d of the bypass valve 26 increases.

As the temperature Tcp of the cathode gas passing through the bypass valve 26 increases, the correction amount of the cathode pressure control valve 24 increases. By changing the correction amount of the cathode pressure control valve 24 according to the temperature Tcp of the cathode gas passing through the bypass valve 26 in this way, a reduction of the stack pressure can be more properly suppressed.

It should be noted that the temperature Tcp of the cathode gas passing through the bypass valve 26 is, for example, detected by a temperature sensor provided in a part of the bypass passage 25 upstream or downstream of the bypass passage 26. The stack pressure compensation amount calculation unit 270 calculates the correction amount of the cathode pressure control valve 24 associated in the temperature correction map on the basis of the temperature Tcp detected by this temperature sensor and the opening degree command value d of the bypass valve 26. The stack pressure compensation amount calculation unit 270 calculates the opening degree correction value of the cathode pressure control valve 24 by multiplying that correction amount by "−1".

FIG. 5 is a graph showing a pressure correction map in which the correction amount of the cathode pressure control valve 24 is set for each pressure Psm of the cathode gas upstream of the bypass valve 26. Here, a horizontal axis represents the opening degree command value d of the bypass valve 26 and a vertical axis represents the correction amount of the cathode pressure control valve 24.

In the pressure correction map, the correction amount of the cathode pressure control valve 24 monotonously increases as the opening degree command value d of the bypass valve 26 increases and the correction amount of the cathode pressure control valve 24 increases as the pressure Psm of the cathode gas upstream of the bypass valve 26 increases.

By changing the correction amount of the cathode pressure control valve 24 according to the pressure Psm of the cathode gas upstream of the bypass valve 26 in this way, a reduction of the stack pressure can be more properly suppressed.

It should be noted that, in the case of using the pressure correction map, the stack pressure compensation amount calculation unit 270 calculates the correction amount of the cathode pressure control valve 24 associated in the pressure correction map, for example, on the basis of the pressure Psm detected by the stack pressure sensor 43 and the opening degree command value d of the bypass valve 26.

Next, the operation of the controller 4 in the present embodiment is described with reference to figures.

Figure 6:
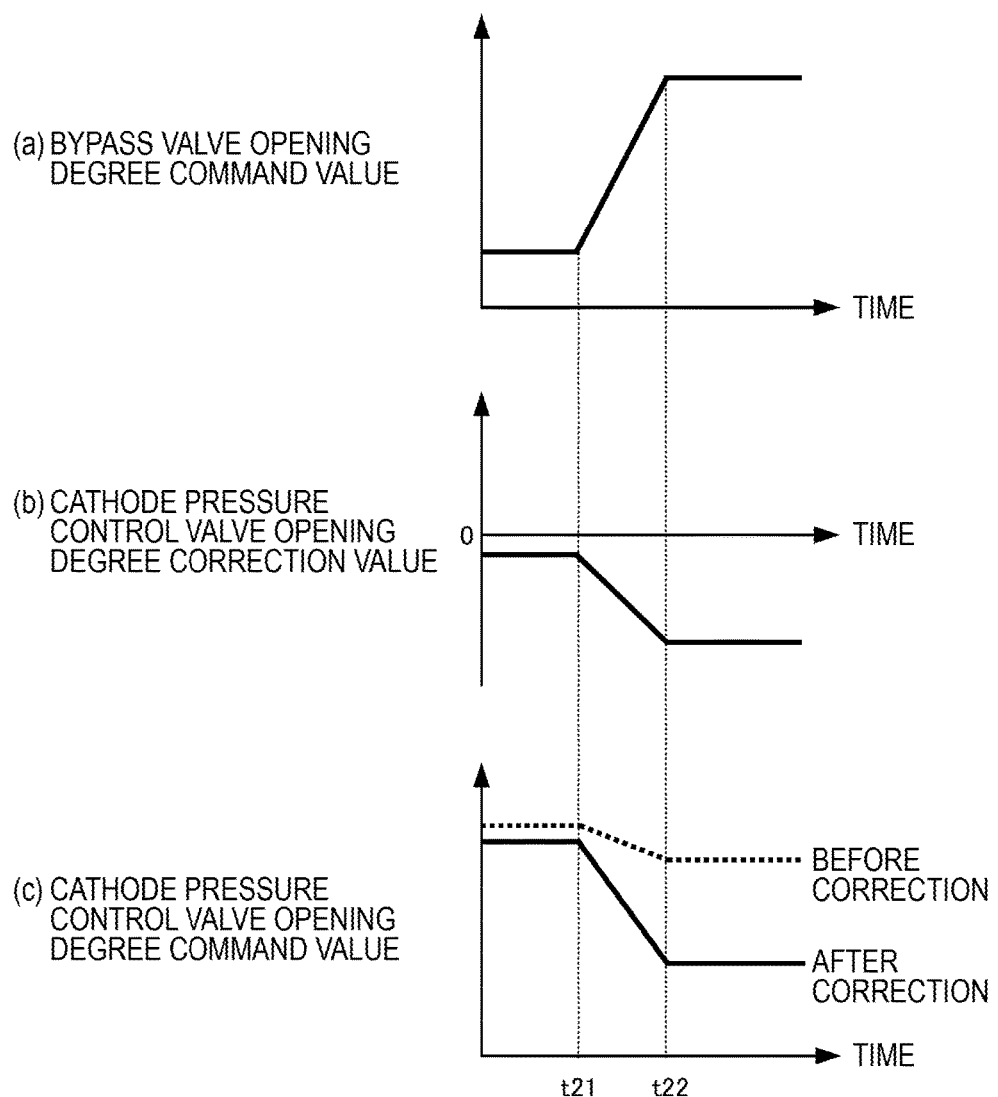

FIG. 6 are time charts showing examples of the operations of the stack pressure compensation amount calculation unit 270 and the correction value addition unit 280.

FIG. 6(*a*) is a chart showing the opening degree command value of the bypass valve 26 calculated by the bypass valve FB control unit 260. FIG. 6(*b*) is a chart showing the opening degree correction value calculated by the stack pressure compensation amount calculation unit 270.

FIG. 6(*c*) is a chart showing the opening degree command value of the cathode pressure control valve 24. In FIG. 6(*c*), the opening degree command value before correction calculated by the pressure control valve/compressor FB control unit 210 is shown by a dotted line and the opening degree command value after correction added with the opening degree correction value by the correction value addition unit 280 is shown by a solid line. Horizontal axes of FIGS. 6(*a*) to 6(*c*) are time axes common to each other.

Before time t21, the opening degree command value of the bypass valve 26, the opening degree correction value of the stack pressure compensation amount calculation unit 270 and the opening degree command value of the cathode pressure control valve 24 are all constant.

At time t21, the opening degree command value of the bypass valve 26 increases and the bypass valve 26 is opened as shown in FIG. 6(*a*). Associated with this, as shown in FIG. 6(*b*), the opening degree correction value output from the stack pressure compensation amount calculation unit 270 decreases as the opening degree command value of the bypass valve 26 increases according to the aforementioned pressure compensation control model. In this way, a reduction of the opening degree command value after correction becomes larger than that of the opening degree command value before correction as shown in FIG. 6(*c*).

At time t22, the opening degree command value of the bypass valve 26 stops increasing as shown in FIG. 6(*a*) and, associated with this, the opening degree correction value and the opening degree command value of the cathode pressure control valve 24 become constant as shown in FIGS. 6(*b*) and 6(*c*).

In this way, the stack pressure compensation amount calculation unit 270 increases a reduction of the opening degree command value of the cathode pressure control valve 24 on the basis of the opening degree command value of the bypass valve 26. This enables a reduction of the pressure to be supplied to the fuel cell stack 1 to be suppressed while the bypass valve 26 is open.

Figure 7:
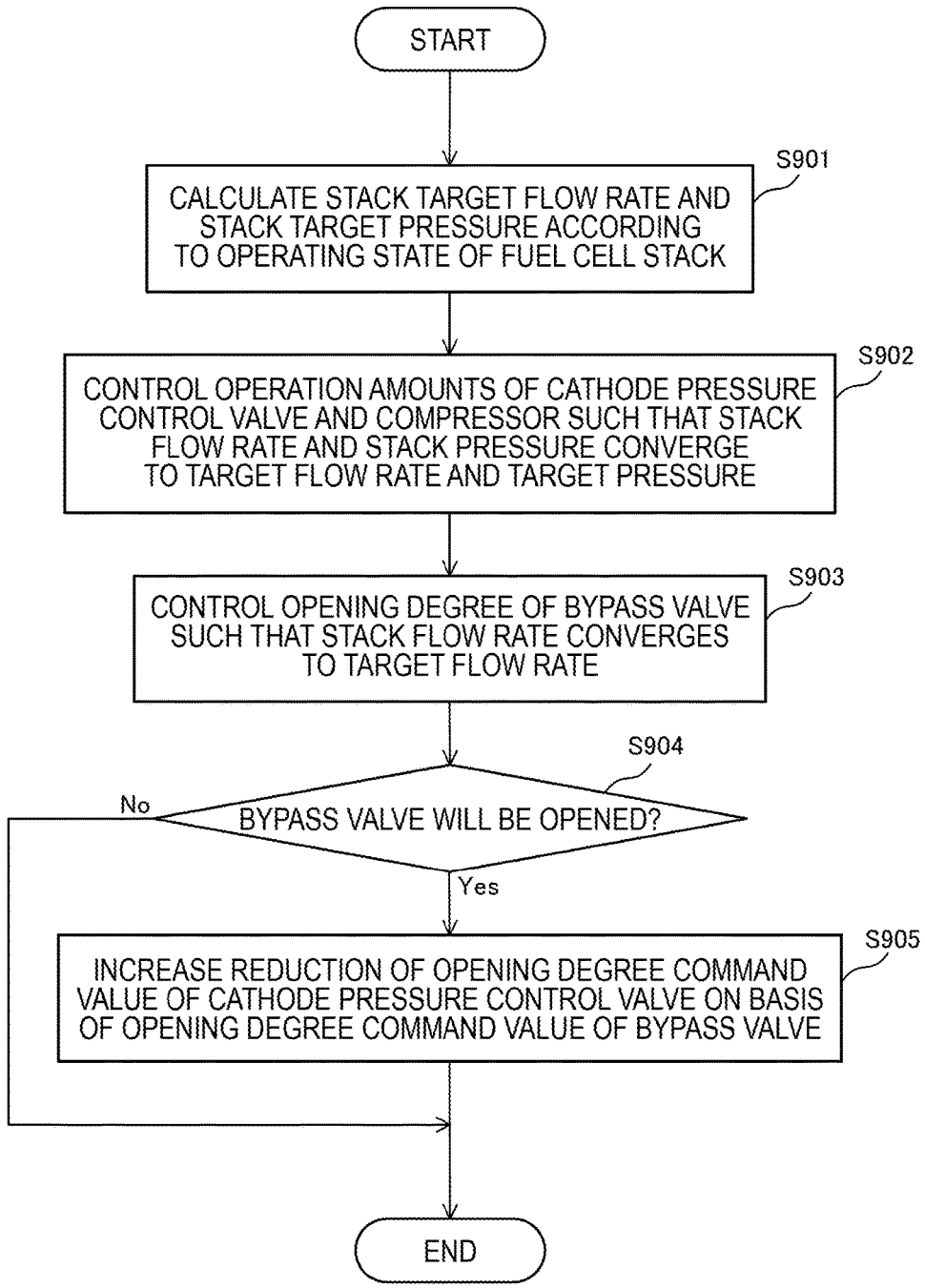
FIG. 7 is a flow chart showing a pressure compensation method for compensating for a reduction of a stack pressure caused when the bypass valve is opened.

FIG. 7 is a flow chart showing a pressure compensation control method for compensating for the pressure of the cathode gas to be supplied to the fuel cell stack 1 in the present embodiment.

In Step S901, the controller 4 calculates the stack target flow rate and the stack target pressure according to the operating states of the fuel cell stack 1. For example, the controller 4 increases both the stack target flow rate and the stack target pressure as the required power required to the fuel cell stack 1 increases.

In Step S902, the pressure control valve/compressor FB control unit 210 calculates the stack request flow rate for the compressor 22 and the opening degree command value for the cathode pressure control valve 24 such that the stack flow rate and the stack pressure converge to the stack target flow rate and the stack target pressure. Then, the compressor target flow rate setting unit 240 sets the largest value out of the stack request flow rate, the surge avoidance request flow rate and the discharged hydrogen dilution request flow rate as the compressor target flow rate.

In Step S903, the bypass valve FB control unit 260 calculates the opening degree command value of the bypass valve 26 such that the stack flow rate converges to the stack target flow rate.

For example, the bypass valve FB control unit 260 sets the opening degree command value of the bypass valve 26 to zero to close the bypass valve 26 if the stack request flow rate is set as the compressor target flow rate.

On the other hand, the bypass valve FB control unit 260 increases the opening degree command value of the bypass valve 26 to open the bypass valve 26 if the surge avoidance request flow rate or the discharged hydrogen dilution request flow rate is set as the compressor target flow rate.

In Step S904, the stack pressure compensation amount calculation unit 270 judges whether or not the opening degree command value of the bypass valve 26 has increased from the previous value, i.e. whether or not the bypass valve 26 will be opened. Then, the stack pressure compensation amount calculation unit 270 finishes the pressure compensation control method of the fuel cell system 100 if the opening degree command value of the bypass valve 26 has not increased.

In Step S905, the stack pressure compensation amount calculation unit 270 increases a reduction of the opening degree command value of the cathode pressure control valve 24 if the bypass valve 26 has been opened. When a processing of Step S905 is completed, the pressure compensation control method of the fuel cell system 100 is finished.

According to the first embodiment of the present invention, the fuel cell system 100 includes the compressor 22 constituting the supply unit configured to supply the cathode gas to the fuel cell stack 1 and the bypass valve 26 configured to bypass the cathode gas to be supplied to the fuel cell stack 1. Further, the fuel cell system 100 includes the stack flow rate sensor 42 and the stack pressure sensor 43 constituting the detection unit configured to detect the states of the cathode gas to be supplied to the fuel cell stack 1 without being bypassed by the bypass valve 26, and the cathode pressure control valve 24 constituting the pressure control unit configured to adjust the pressure of the cathode gas to be supplied to the fuel cell stack 1.

Further, the controller 4 configured to control the fuel cell system 100 includes a calculation unit configured to calculate the target flow rate and the target pressure of the cathode gas to be supplied to the fuel cell stack 1 according to the operating states of the fuel cell stack 1.

Further, the controller 4 includes the pressure control valve/compressor FB control unit 210 constituting an operating state control unit configured to control the operation amount of at least one unit out of the compressor 22 and the pressure control valve 24 on the basis of the flow rate and pressure of the cathode gas detected by the detection unit and the calculated target flow rate and target pressure. By this pressure control valve/compressor FB control unit 210, the stack flow rate and the stack pressure can be properly converged to the respective target values in accordance with the operation characteristics of the compressor 22 and the cathode pressure control valve 24 and the internal structure of the fuel cell stack 1 when the stack target flow rate and the stack target pressure change.

The controller 4 also includes the bypass valve FB control unit 260 configured to open and close the bypass valve 26 on the basis of the flow rate and target flow rate of the cathode gas detected by the detection unit and the stack pressure compensation amount calculation unit 270 constituting the pressure compensation unit configured to increase the operation amount of the cathode pressure control valve 24 when the bypass valve 26 is opened.

Since influences by the operation of the bypass valve 26 are taken into account in advance by this stack pressure compensation amount calculation unit 270 when the bypass valve 26 is opened, a reduction of the pressure of the cathode gas to be supplied to the fuel cell stack 1 can be suppressed without monitoring the stack pressure. Thus, it can be suppressed that the stack pressure becomes lower than the target pressure as shown by the broken line of FIG. 3(*c*) and the generated power of the fuel cell stack 1 is temporarily reduced.

Accordingly, a reduction of power generation performance of the fuel cell stack 1 due to the bypassing of the cathode gas supplied to the fuel cell stack 1 can be suppressed.

As described above, in the present embodiment, a reduction of the stack pressure caused when the bypass valve 26 is opened can be compensated for by the stack pressure compensation amount calculation unit 270 while the stack flow rate and the stack pressure are properly converged to the respective target values in accordance with the operation characteristics of the compressor 22 and the cathode pressure control valve 24 and the internal structure of the fuel cell stack 1 by the pressure control valve/compressor FB control unit 210. Specifically, a reduction of the stack pressure caused by the operation of the bypass valve 26 can be compensated for without monitoring the stack pressure in a configuration in which the stack flow rate and the stack pressure are properly feedback-controlled by the pressure control valve/compressor FB control unit 210.

Further, in the present embodiment, when the bypass valve 26 is opened, the stack pressure compensation amount calculation unit 270 increases a reduction of the opening degree of the cathode pressure control valve 24 per unit time as compared to the case where the cathode pressure control valve 24 is opened by the pressure control valve/compressor FB control unit 210. In this way, the cathode pressure control valve 24 can be closed at a faster speed.

Thus, the stack pressure can be prevented from becoming drastically lower than the stack target pressure as shown by the broken line of FIG. 3(c) without increasing the power consumption of the fuel cell system 100. Therefore, a situation can be avoided by a simple configuration where the differential pressure between the anode gas pressure and the cathode gas pressure in the fuel cell stack 1 exceeds the allowable pressure of the electrolyte membranes to degrade power generation performance.

(Second Embodiment)

Figure 8:
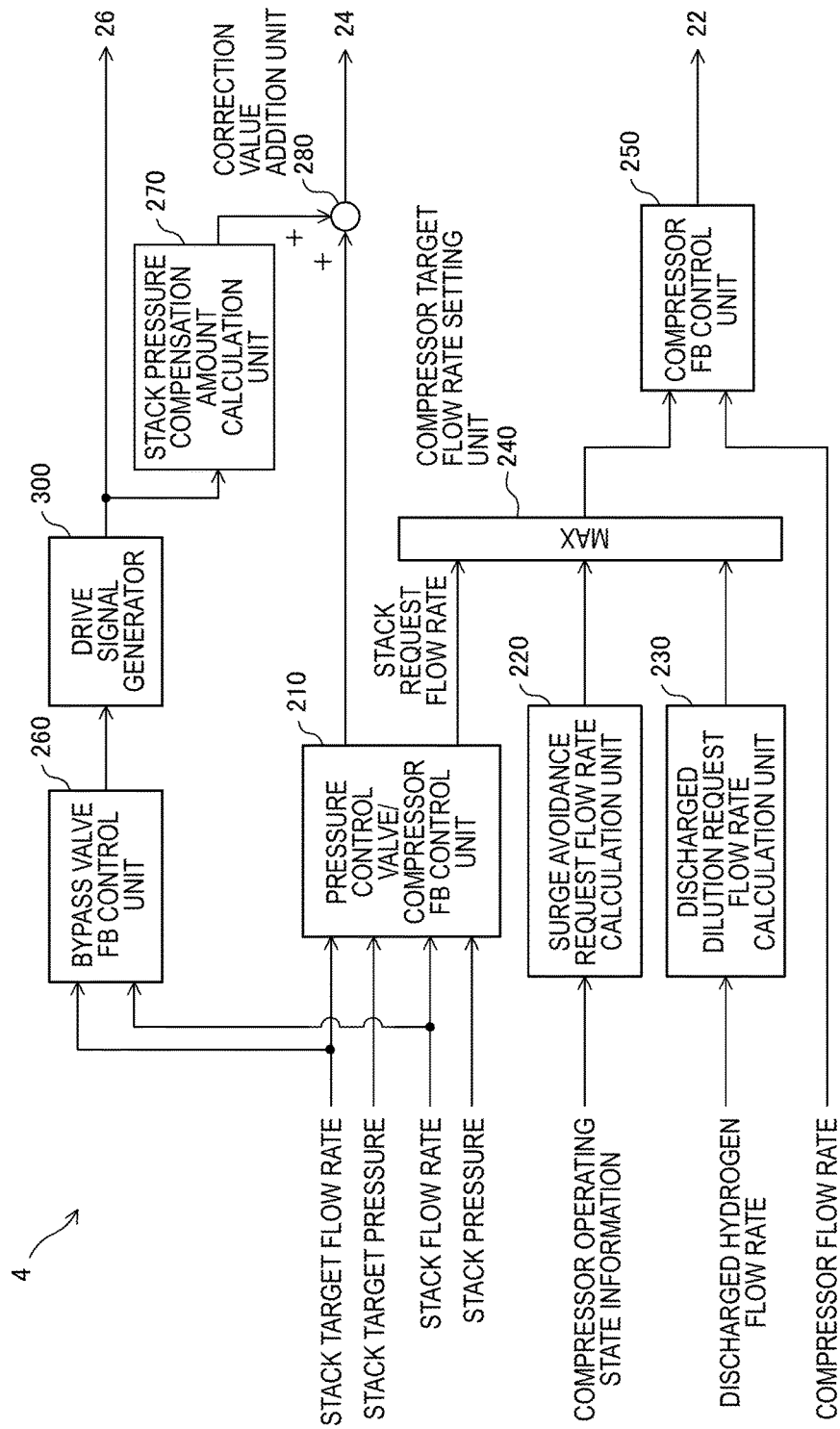
FIG. 8 is a block diagram showing a functional configuration of a controller in a second embodiment of the present invention, FIG. 9 are time charts showing a technique of a calculation process for correcting an opening degree command value of a cathode pressure control valve.

FIG. 8 is a block diagram showing a functional configuration of a controller 4 in a second embodiment of the present invention.

The controller 4 includes a drive signal generation unit 300 in addition to the components of the controller 4 shown in FIG. 2. Since the other components are the same as those shown in FIG. 2, they are denoted by the same reference signs and not described in detail.

The drive signal generation unit 300 generates a drive signal for driving a bypass valve 26 on the basis of an opening degree command value of the bypass valve 26 output from a bypass valve FB control unit 260.

In the present embodiment, a control valve whose opening degree is increased in a stepwise manner is used as the bypass valve 26. Thus, the drive signal generation unit 300 converts a change of the opening degree command value to the bypass valve 26 into a stepped waveform and outputs that converted value as the drive signal to the bypass valve 26. Further, the drive signal generation unit 300 limits the opening degree command value to the bypass valve 26 within a driving range of the bypass valve 26 and outputs that limited drive signal to the bypass valve 26.

A stack pressure compensation amount calculation unit 270 calculates an opening degree correction value of a cathode pressure control valve 24 on the basis of the stepped drive signal output from the drive signal generation unit 300. A correction value addition unit 280 adds that opening degree correction value to an opening degree command value of the cathode pressure control valve 24 from a pressure control valve/compressor FB control unit 210 and outputs that sum to the cathode pressure control valve 24.

Figure 9:
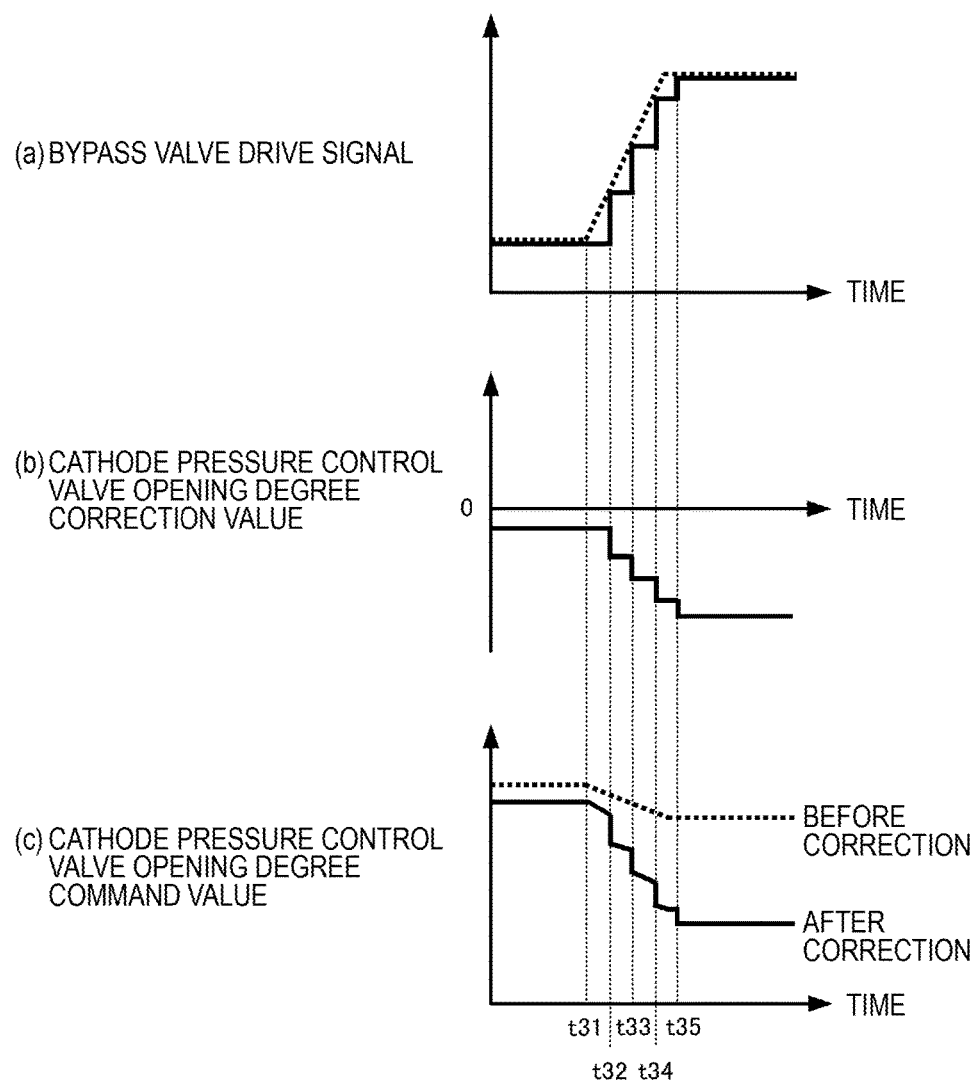

FIG. 9 are time charts showing examples of the operations of the stack pressure compensation amount calculation unit 270 and the correction value addition unit 280 in the present embodiment.

FIG. 9(a) is a chart showing the drive signal of the bypass valve 26. FIGS. 9(b) and 9(c) are charts respectively showing the same parameters as in the FIGS. 6(b) and 6(c). Further, horizontal axes of FIGS. 9(a) to 9(c) are time axes common to each other.

In FIG. 9(a), the drive signal output from the drive signal generation unit 300 is shown by a solid line and the opening degree command value of the bypass valve 26 output from the bypass valve FB control unit 260 is shown by a dotted line.

Before time t31, the opening degree command value of the bypass valve 26, the opening degree correction value of the stack pressure compensation amount calculation unit 270 and the opening degree command value of the cathode pressure control valve 24 are all constant as in FIGS. 6(a) to 6(c).

From time t31 to time t35, the opening degree command value of the bypass valve 26 linearly increases as shown in FIG. 9(a), wherefore the drive signal increases in a stepwise manner. Specifically, the drive signal increases to the opening degree command value of the bypass valve 26 at time t32, is kept at a fixed value thereafter, then increases again at time t33 and is kept at a fixed value. Also at time t34 and time t35, the drive signal increases in a stepwise manner to the opening degree command value of the bypass valve 26.

As just described, since the waveform of the drive signal is stepped when the bypass valve 26 is open, the bypass valve 26 is opened little by little and the stack pressure decreases every time.

Associated with this, the opening degree correction value becomes smaller in a stepwise manner as shown in FIG. 9(b). This causes the opening degree command value of the cathode pressure control valve 24 to become smaller in a stepwise manner according to the drive signal of the bypass valve 26 as shown by the solid line in FIG. 9(c). Specifically, an operation amount of the cathode pressure control valve 24 increases in a stepwise manner as the bypass valve 26 is opened in a stepwise manner.

As described above, by using the limited drive signal when the operation of the bypass valve 26 is limited, the stack pressure compensation amount calculation unit 270 can calculate the opening degree correction value of the cathode pressure control valve 24 from cathode gas state quantities more approximate to the operation of the bypass valve 26. Thus, a reduction of the stack pressure can be more suppressed.

According to the second embodiment of the present invention, a fuel cell system 100 includes the bypass valve 26 configured to change the opening degree thereof in a stepwise manner. The stack pressure compensation amount calculation unit 270 increases a reduction of the opening degree of the cathode pressure control valve 24 every time the opening degree of the bypass valve 26 is increased in a stepwise manner when the bypass valve 26 is open.

Since the opening degree command value of the cathode pressure control valve 24 is corrected in accordance with the stepwise operation of the bypass valve 26 in this way, reductions of the stack pressure successively occurring when the bypass valve 26 is opened in a stepwise manner can be more properly compensated for.

(Third Embodiment)

Figure 10:
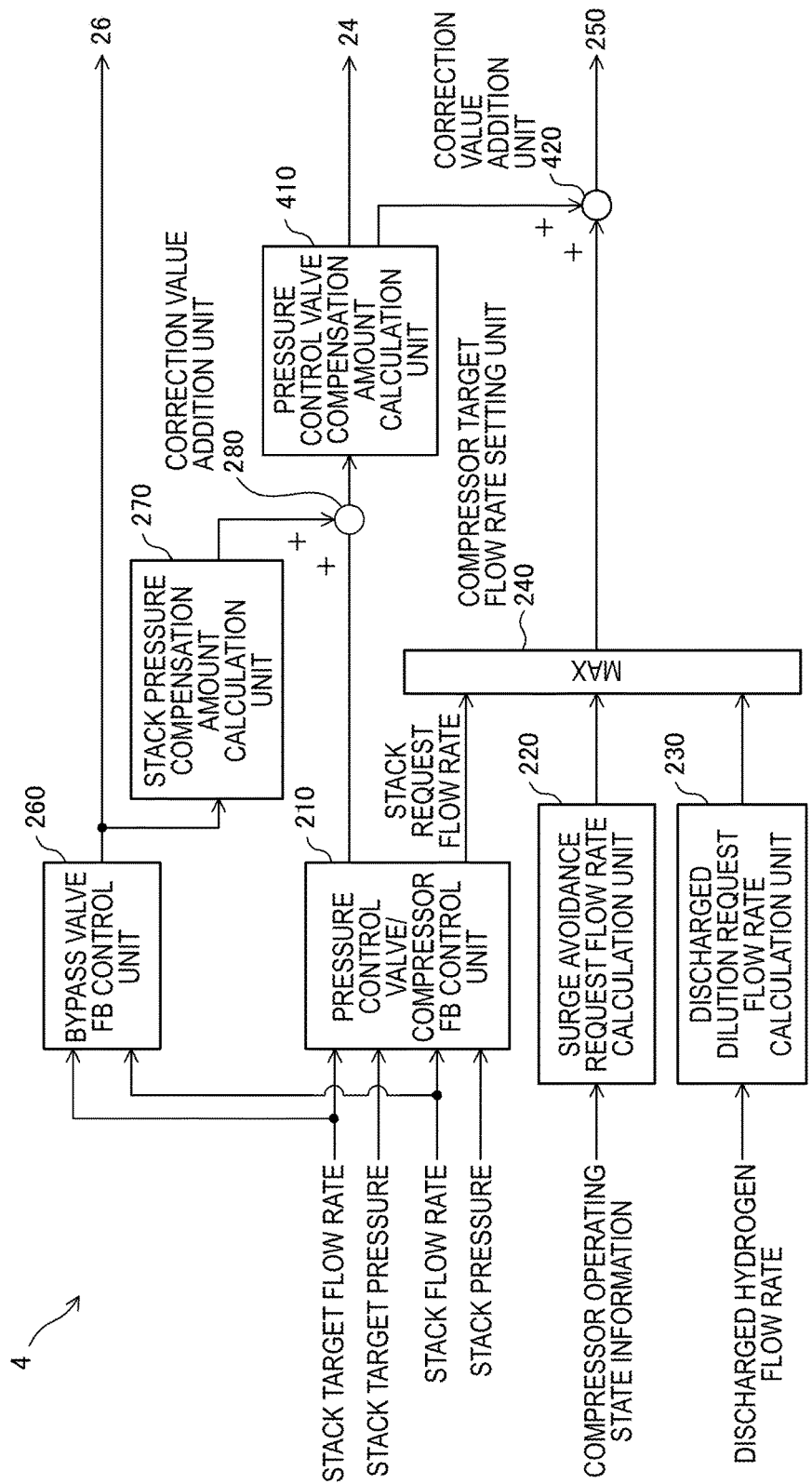
FIG. 10 is a block diagram showing a functional configuration of a controller in a third embodiment of the present invention, FIG. 11 are time charts showing a technique of a calculation process for correcting a compressor flow rate when a cathode pressure control valve is fully closed.

FIG. 10 is a block diagram showing a functional configuration of a controller 4 in a third embodiment of the present invention.

The controller 4 of the present embodiment includes a pressure control valve compensation amount calculation unit 410 and a correction value addition unit 420 in addition to the components of the controller 4 shown in FIG. 2. Since the other components are the same as those shown in FIG. 2, they are denoted by the same reference signs and not described in detail.

The pressure control valve compensation amount calculation unit 410 constitutes a pressure compensation unit configured to compensate for a reduction of a stack pressure, which cannot be compensated for by a cathode pressure control valve 24, by a compressor 22 on the basis of an opening degree command value after correction output from a correction value addition unit 280.

In the present embodiment, the pressure control valve compensation amount calculation unit 410 calculates a flow rate correction value necessary to compensate for the stack pressure by the compressor 22 as a compensation amount on the basis of a reduction amount of the opening degree command value from zero if the opening degree command value after correction is smaller than zero.

For example, a compressor flow rate correction map indicating a relationship between the reduction amount of the opening degree command value of the cathode pressure control valve 24 and the flow rate correction value is stored in advance in the pressure control valve compensation amount calculation unit 410. When obtaining the opening degree command value from the correction value addition unit 280, the pressure control valve compensation amount calculation unit 410 refers to the compressor flow rate correction map and calculates the flow rate correction value associated with a reduction amount of that opening degree command value. It should be noted that the compressor flow rate correction map is determined in advance by experimental data and the like.

The pressure control valve compensation amount calculation unit 410 sets the opening degree command value to zero and outputs the opening degree command value to the cathode pressure control valve 24 and outputs the flow rate correction value based on the reduction amount to the correction value addition unit 420 if the opening degree command value of the cathode pressure control valve 24 is smaller than zero. Further, if the opening degree command value of the cathode pressure control valve 24 is not smaller than zero, the pressure control valve compensation amount calculation unit 410 outputs that opening degree command value to the cathode pressure control valve 24.

It should be noted that although an example of calculating the flow rate correction value using the compressor flow rate correction map has been described in the present embodiment, the pressure control valve compensation amount calculation unit 410 may calculate the flow rate correction value on the basis of Equation (9) derived by the pressure compensation control model.

The correction value addition unit 420 corrects the compressor target flow rate by adding the flow rate correction value output from the pressure control valve compensation amount calculation unit 410 to the compressor target flow rate output from a compressor target flow rate setting unit 240. Then, the correction value addition unit 420 outputs a value obtained by adding the flow rate correction value to the compressor target flow rate, i.e. a compressor target flow rate after correction to a compressor FB control unit 250.

Figure 11:
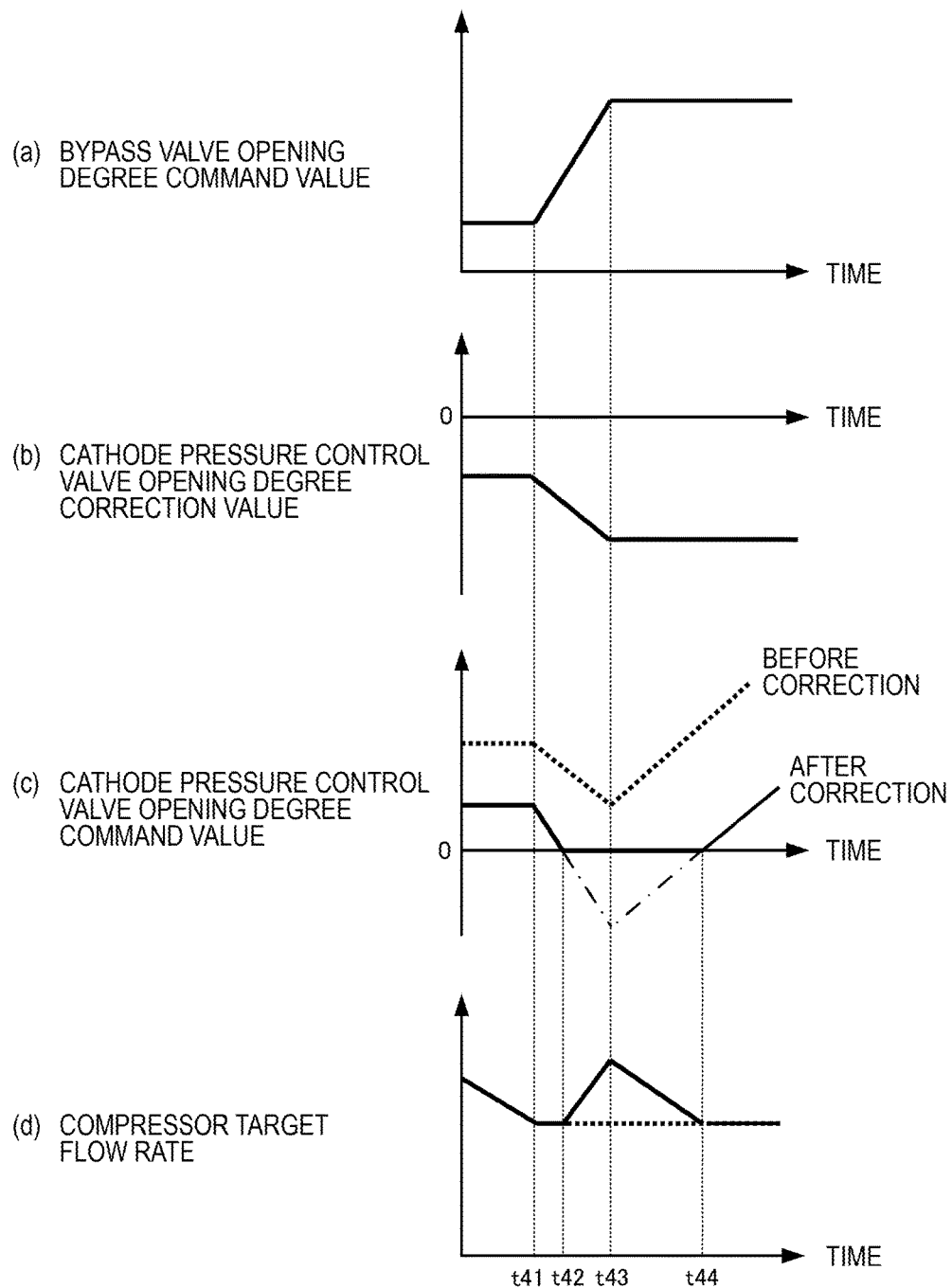

FIG. 11 are time charts showing the operation of the controller 4 in the present embodiment.

FIG. 11(a) is a chart showing an opening degree command value of a bypass valve 26 calculated by a bypass valve FB control unit 260. FIG. 11(b) is a chart showing the opening degree correction value calculated by the stack pressure compensation amount calculation unit 270.

FIG. 11(c) is a chart showing the opening degree command value of the cathode pressure control valve 24. In FIG. 11(c), the opening degree command value before correction is shown by a dotted line and the opening degree command value after correction is shown by a solid line. Further, in FIG. 11(c), a compensation amount of the stack pressure which cannot be compensated for using the cathode pressure control valve 24 since the cathode pressure control valve 24 is fully closed is shown by a dashed-dotted line.

FIG. 11(d) is a chart showing a target flow rate of the compressor 22. In FIG. 11(d), the compressor target flow rate before correction output from the compressor target flow rate setting unit 240 is shown by a dotted line and the compressor target flow rate after correction is shown by a solid line. It should be noted that horizontal axes of FIGS. 11(a) to 11(d) are time axes common to each other.

Before time t41, the opening degree command value of the bypass valve 26, the opening degree correction value of the stack pressure compensation amount calculation unit 270 and the opening degree command value of the cathode pressure control valve 24 are all constant and the compressor target flow rate is reduced.

At time t41, the opening degree command value of the bypass valve 26 increases and the bypass valve 26 is opened as shown in FIG. 11(a). Associated with this, as shown in FIG. 11(b), the opening degree correction value decreases as the opening degree command value of the bypass valve 26 increases according to the aforementioned pressure compensation control model. In this way, a change amount of the opening degree command value after correction becomes larger than that of the opening degree command value before correction as shown in FIG. 11(c). Specifically, an operation amount of the cathode pressure control valve 24 increases.

At time t42, the opening degree command value after correction becomes zero, i.e. the bypass valve 26 is fully closed, and this opening degree command value further becomes smaller than zero as shown in FIG. 11(c). At this time, the opening degree command value to be output to the cathode pressure control valve 24 is set to zero. Thus, in the cathode pressure control valve 24, a reduction of the stack pressure cannot be compensated for.

Accordingly, in the present embodiment, the pressure control valve compensation amount calculation unit 410 calculates the flow rate correction value of the compressor 22 on the basis of the reduction amount of the opening degree command value after correction from zero and the correction value addition unit 420 adds that flow rate correction value to the compressor target flow rate. Thus, as shown in FIG. 11(d), the compressor target flow rate after correction increases as the reduction amount of the opening degree command value after correction increases.

As just described, a reduction of the stack pressure can be suppressed by increasing the compressor flow rate when the bypass valve 26 is open with the cathode pressure control valve 24 fully closed.

At time t43, an increase of the opening degree command value of the bypass valve 26 stops as shown in FIG. 11(a) and, associated with this, the opening degree correction value of the cathode pressure control valve 24 becomes constant as shown in FIGS. 11(b) and 11(c).

Since the opening degree command value after correction increases as shown by the dashed-dotted line of FIG. 11(c), the compressor target flow rate decreases as the reduction amount of the opening degree command value decreases as shown in FIG. 11(d).

After time t44, since the opening degree command value after correction becomes larger than zero as shown in FIG. 11(c), the compressor target flow rate returns to an original value as shown in FIG. 11(d).

The pressure control valve compensation amount calculation unit 410 increases the operation amount of the compressor 22 according to the reduction amount of the opening degree command value of the cathode pressure control valve 24 in this way, whereby a pressure reduction of cathode gas to be supplied to a fuel cell stack 1 can be reliably compensated for.

Figure 12:
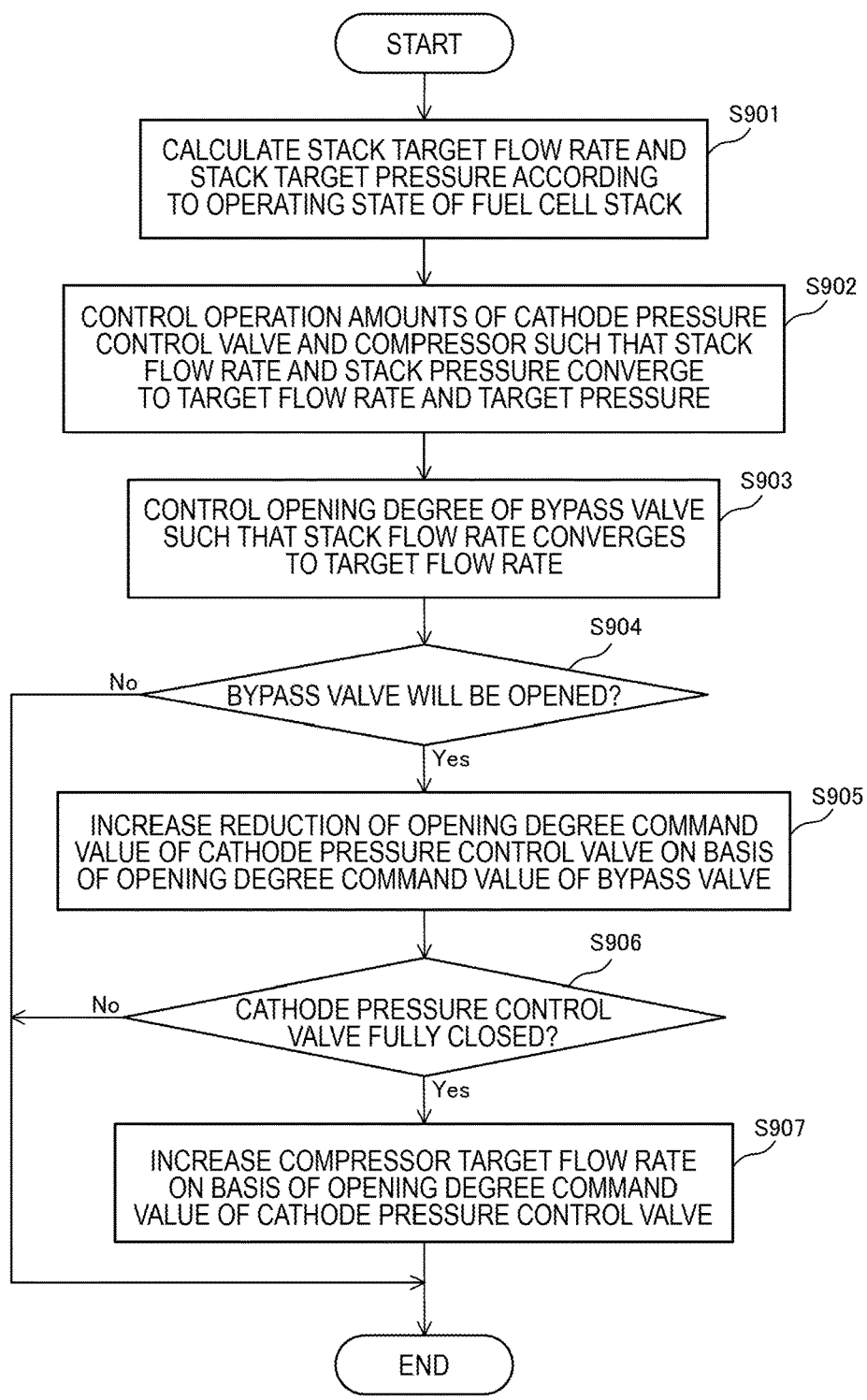
FIG. 12 is a flow chart showing a pressure compensation method in the third embodiment.

FIG. 12 is a flow chart showing an example of a pressure compensation control method in the present embodiment.

The pressure compensation control method of the present embodiment is obtained by adding processings of Steps S906 and S907 to the procedure of a series of processings from Step S901 to S905 shown in FIG. 7. Thus, only the processings of Steps S906 and S907 are described here.

In Step S906, the pressure control valve compensation amount calculation unit 410 judges whether or not the opening degree command value after correction of the cathode pressure control valve 24 is smaller than zero, i.e. whether or not the cathode pressure control valve 24 is fully closed. The pressure control valve compensation amount calculation unit 410 finishes the pressure compensation control method unless the cathode pressure control valve 24 is fully closed.

In Step S907, the pressure control valve compensation amount calculation unit 410 calculates the flow rate correction value on the basis of the reduction amount of the opening degree command value from zero and the correction value addition unit 420 adds that flow rate correction value to the compressor target flow rate if the opening degree command value after correction is smaller than zero. In this way, the compressor target flow rate can be increased when the bypass valve 26 is open.

When the processing of Step S907 is completed, the procedure of a series of processings of the pressure compensation control method is finished.

According to the third embodiment of the present invention, a fuel cell system 100 further includes the pressure control valve compensation amount calculation unit 410 constituting the pressure compensation unit configured to increase the operation amount of the compressor 22 when the cathode pressure control valve 24 is fully closed in the case of opening the bypass valve 26.

In this way, even if a reduction of the stack pressure cannot be compensated for by the cathode pressure control valve 24 while the bypass valve 26 is open, the reduction of the stack pressure can be properly suppressed utilizing the compressor 22.

(Fourth Embodiment)

Figure 13:
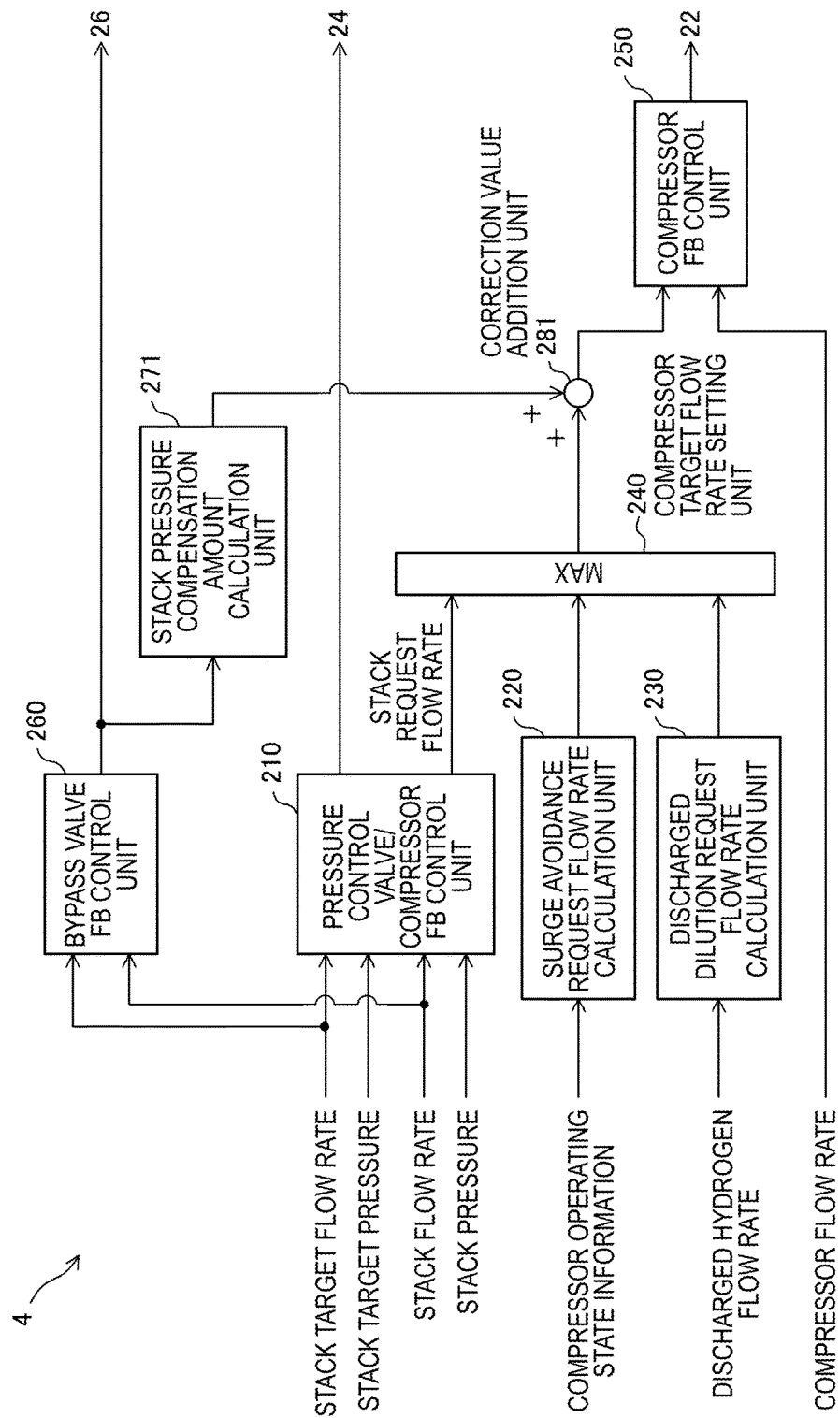
FIG. 13 is a block diagram showing a functional configuration of a controller in a fourth embodiment of the present invention.

FIG. 13 is a block diagram showing a functional configuration of a controller 4 in a fourth embodiment of the present invention.

The controller 4 of the present embodiment includes a stack pressure compensation amount calculation unit 271 and a correction value addition unit 281 instead of the stack pressure compensation amount calculation unit 270 and the correction value addition unit 280 of the controller 4 shown in FIG. 2. Since the other components are the same as those shown in FIG. 2, they are denoted by the same reference signs and not described in detail.

The stack pressure compensation amount calculation unit 271 calculates a compensation amount for compensating for a reduction of a stack pressure caused when a bypass valve 26 is opened, using a pressure compensation control model basically similarly to the stack pressure compensation amount calculation unit 270.

The stack pressure compensation amount calculation unit 271 calculates a flow rate correction value for correcting a stack request flow rate of a compressor 22 as the compensation amount on the basis of an opening degree command value of the bypass valve 26.

The correction value addition unit 281 adds the flow rate correction value of the compressor 22 to a compressor target flow rate output from a compressor target flow rate setting unit 240. Specifically, an operation amount of the compressor 22 increases.

Figure 14:
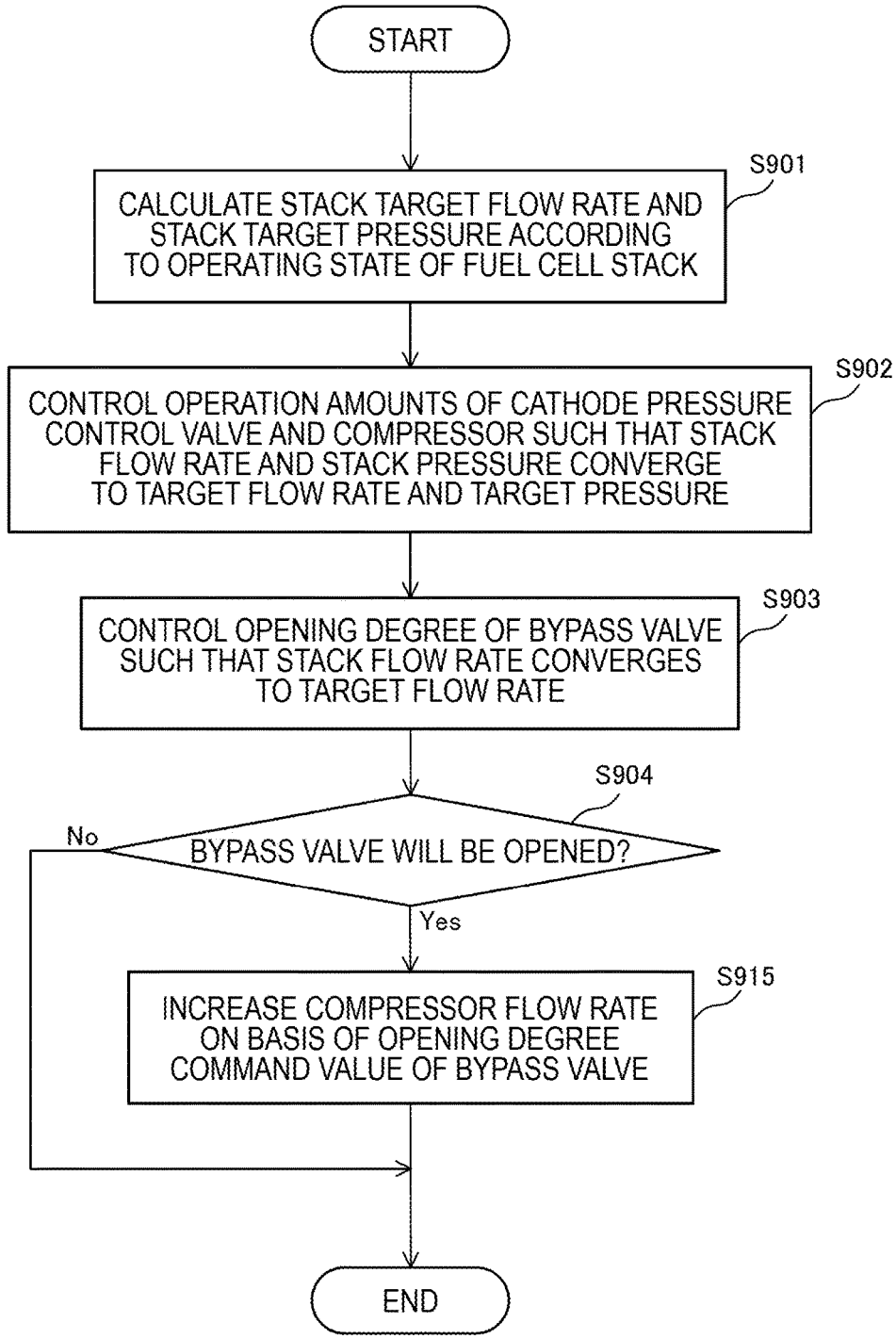
FIG. 14 is a flow chart showing a pressure compensation method in the fourth embodiment.

FIG. 14 is a flow chart showing a pressure compensation control method by the controller 4. Here, a processing of Step S915 is performed instead of the processing of Step S905 shown in FIG. 7. Thus, only the processing of Step S915 is briefly described.

In Step S915, the stack pressure compensation amount calculation unit 271 calculates the flow rate correction value of the compressor 22 on the basis of the opening degree command value of the bypass valve 26 if it is judged in Step S904 that the bypass valve 26 will be opened. Then, the correction value addition unit 281 adds the flow rate correction value of the compressor 22 to the compressor target flow rate from the compressor target flow rate setting unit 240 to increase the compressor target flow rate.

According to the fourth embodiment of the present invention, not an operation amount of the cathode pressure control valve 24, but the operation amount of the compressor 22 is increased when the bypass valve 26 is opened. Even in this case, a reduction of the stack pressure when the bypass valve 26 is opened can be suppressed, wherefore a reduction of power generation performance of a fuel cell stack 1 can be suppressed.

(Fifth Embodiment)

Figure 15:
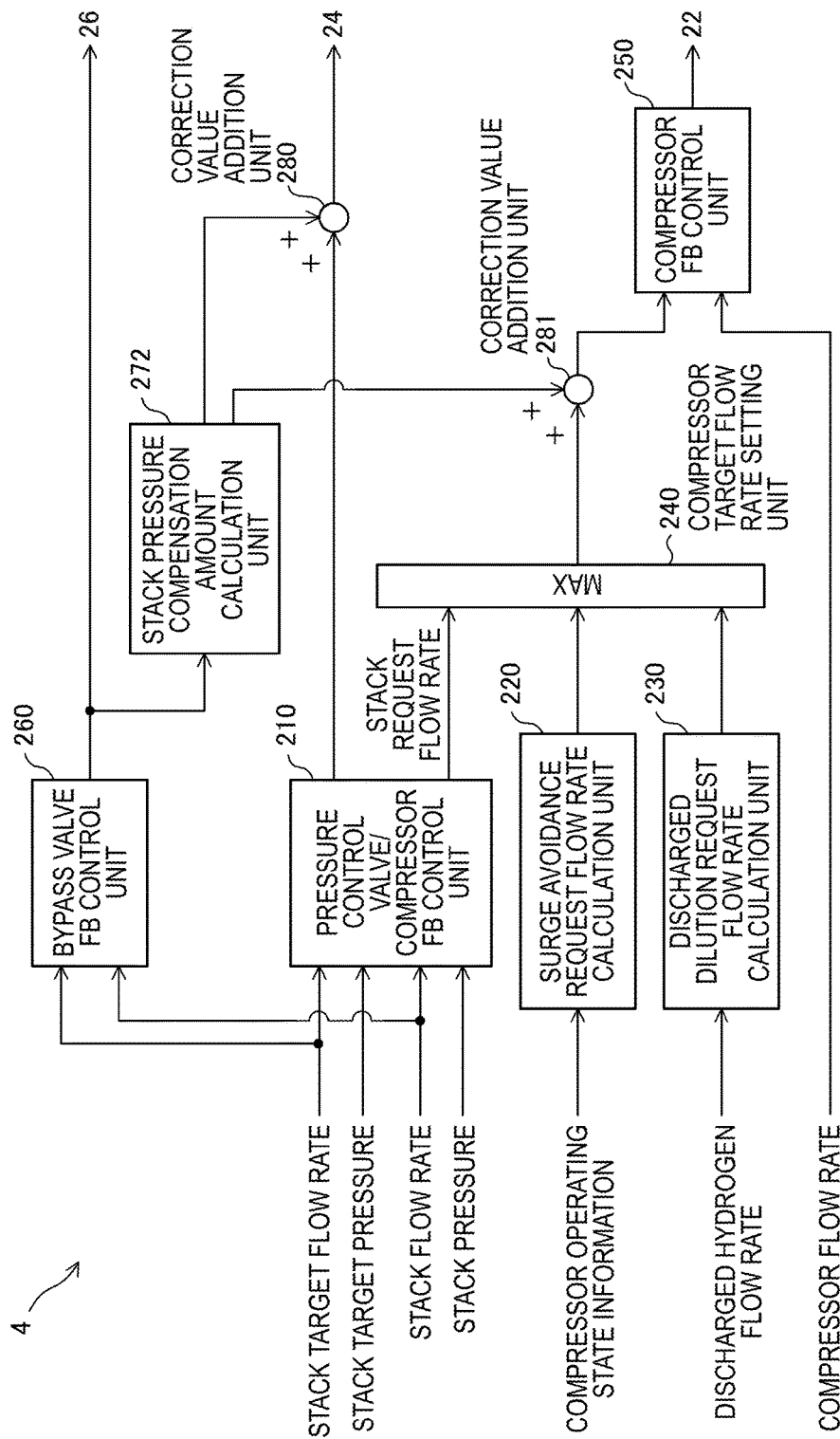
FIG. 15 is a block diagram showing a functional configuration of a controller in a fifth embodiment of the present invention.

FIG. 15 is a block diagram showing a functional configuration of a controller 4 in a fifth embodiment of the present invention.

The controller 4 of the present embodiment includes a stack pressure compensation amount calculation unit 272 and a correction value addition unit 281 instead of the stack pressure compensation amount calculation unit 270 of the controller shown in FIG. 2. Since the other components are the same as those shown in FIG. 2, they are denoted by the same reference signs and not described in detail.

The stack pressure compensation amount calculation unit 272 calculates a compensation amount for compensating for a reduction of a stack pressure caused when a bypass valve 26 is opened, using a pressure compensation control model basically similarly to the stack pressure compensation amount calculation unit 270.

The stack pressure compensation amount calculation unit 272 calculates a flow rate correction value of a compressor 22 and an opening degree correction value of a cathode pressure control valve 24 on the basis of an opening degree command value of the bypass valve 26. In this way, operation amounts of both the compressor 22 and the cathode pressure control valve 24 can be increased.

According to the fifth embodiment of the present invention, a reduction of the stack pressure caused when the bypass valve 26 is opened can be quickly canceled out by simultaneously increasing the operation amount of the compressor 22 and that of the cathode pressure control valve 24 when the bypass valve 26 is opened.

As just described above, according to the first to fifth embodiments, the controller 4 increases the operation amount of at least one of the compressor 22 and the cathode pressure control valve 24 when the bypass valve 26 is opened. In this way, the pressure of the cathode gas to be supplied to the fuel cell stack 1 can be compensated for and a reduction of power generation performance of the fuel cell stack 1 can be suppressed.

It should be noted that although an example of compensating for the stack pressure by increasing the operation amount of at least one of the compressor 22 and the cathode pressure control valve 24 when the bypass valve 26 is opened has been described in the present embodiment, there is no limitation to this. For example, the operation of opening the bypass valve 26 may be delayed.

(Sixth Embodiment)

Figure 16:
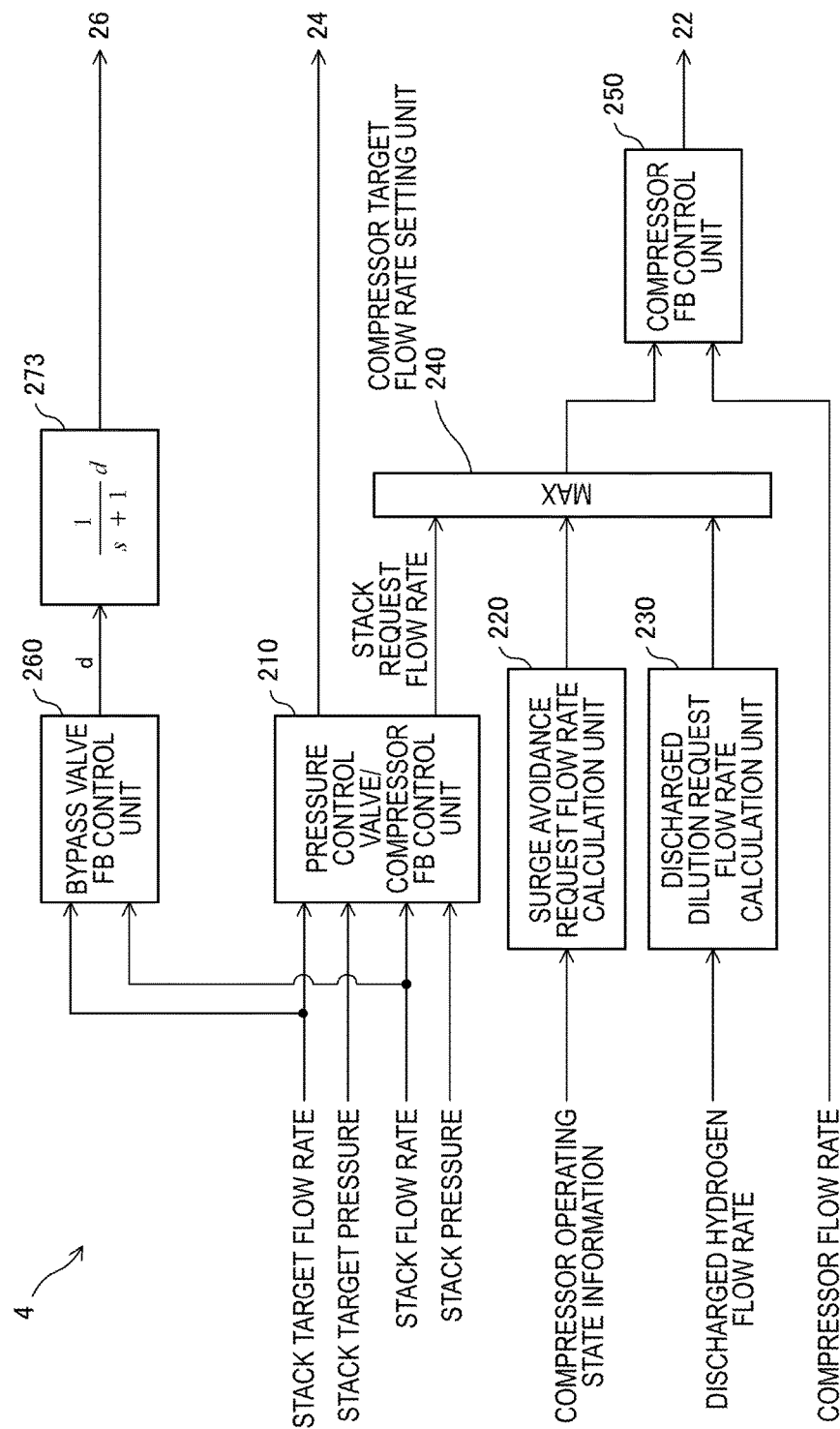
FIG. 16 is a block diagram showing a functional configuration of a controller in a sixth embodiment of the present invention.

FIG. 16 is a block diagram showing a functional configuration of a controller 4 in a sixth embodiment of the present invention.

A stack pressure compensation amount calculation unit 273 is realized by a delay circuit having a transfer function and including a primary or secondary delay element.

In the present embodiment, the stack pressure compensation amount calculation unit 273 applies a primary delay processing to an opening degree command value d of a bypass valve 26 output from a bypass valve FB control unit 260. In this way, the bypass valve 26 can be opened at a slower speed as compared to the case where the bypass valve 26 is directly controlled by the bypass valve FB control unit 260 as in the above embodiments.

Since this causes a cathode pressure control valve 24 to be closed before the bypass valve 26 is opened, a reduction of a stack pressure can be suppressed.

Although the embodiments of the present invention have been described above, the above embodiments are merely an illustration of some application examples of the present invention and not intended to limit the technical scope of the present invention to the specific configurations of the above embodiments.

For example, a moisture recovery device configured to collect moisture in the cathode off-gas flowing in the cathode gas discharge passage 23 and humidify the cathode gas flowing in the cathode gas supply passage 21 with that collected moisture may be provided in the fuel cell system 100. Even in such a case, functions and effects as in the present embodiments can be obtained by preparing a map, taking into account a pressure loss and the like of the moisture recovery device.

Further, although the anode gas supplying/discharging device 3 has been described, taking a non-circulation type dead end system as an example in the present embodiments, the anode gas supplying/discharging device 3 may be a circulation type system.

Further, although an example of using the compressor as the supply unit configured to supply the cathode gas has been described in the present embodiments, a pump may be used.

It should be noted that the above embodiments can be combined as appropriate.

The invention claimed is:

1. A fuel cell system, comprising;
    a cathode gas supply device that supplies cathode gas to a fuel cell;
    a bypass valve that bypasses the cathode gas to be supplied to the fuel cell by the cathode gas supply device;
    a sensor that detects a state of the cathode gas to be supplied to the fuel cell without being bypassed by the bypass valve;
    a pressure adjusting device that adjusts a pressure of the cathode gas to be supplied to the fuel cell;
    a controller programmed to:
    calculate a target flow rate and a target pressure of the cathode gas to be supplied to the fuel cell according to an operating state of the fuel cell;
    control at least one of a pressure operation amount sufficient for the pressure adjusting device to supply an operating pressure of the cathode gas or a flow rate operation amount sufficient for the cathode gas supply device to supply an operating flow rate of the cathode gas on the basis of a flow rate and the pressure of the cathode gas detected by the sensor and the calculated target flow rate and the calculated target pressure;
    open and close the bypass valve on the basis of the flow rate of the cathode gas detected by the sensor and the calculated target flow rate; and
    increase the pressure of the cathode gas to be supplied to the fuel cell by increasing the at least one operation amount calculated when the bypass valve is opened.

2. The fuel cell system according to claim 1, wherein:
    the controller is programmed to add a compensation amount for compensating for a reduction of the cathode gas pressure caused by the escape of the cathode gas to be supplied to the fuel cell to outside air when the bypass valve is opened to the at least one calculated operation amount.

3. The fuel cell system according to claim 1, wherein:
    the pressure adjusting device includes a pressure control valve capable of changing an opening degree; and
    the controller is programmed to add a correction value calculated on the basis of the opening degree of the bypass valve to a calculated opening degree of the pressure control valve.

4. The fuel cell system according to claim 3, wherein:
    the bypass valve is configured such that the opening degree thereof is changed in a stepwise manner; and
    the controller is programmed to reduce the opening degree of the pressure control valve by a fixed width every time the opening degree of the bypass valve is increased in a stepwise manner in the case of opening the bypass valve.

5. The fuel cell system according to claim 3, wherein:
    the controller is programmed to increase the operation amount of the cathode gas supply device controlled by the controller when the pressure control valve is fully closed in the case of opening the bypass valve.

6. The fuel cell system according to claim 1, wherein:
    the cathode gas supply device includes a compressor that adjusts the flow rate of the cathode gas; and
    the controller is programmed to increase the flow rate of the cathode gas to be supplied to the fuel cell from the compressor when the bypass valve is opened.

7. A control method for a fuel cell system with a cathode gas supply device that supplies cathode gas to a fuel cell, a bypass valve configured to bypass the cathode gas to be supplied to the fuel cell by the cathode gas supply device, a sensor that detects a state of the cathode gas to be supplied to the fuel cell without being bypassed by the bypass valve and a pressure adjusting device that adjusts a pressure of the cathode gas to be supplied to the fuel cell, comprising:
    calculating a target flow rate and a target pressure of the cathode gas to be supplied to the fuel cell according to an operating state of the fuel cell;
    controlling at least one of a pressure operation amount sufficient for the pressure adjusting device to supply an operating pressure of the cathode gas or a flow rate operation amount sufficient for the cathode gas supply device to supply an operating flow rate of the cathode gas on the basis of a flow rate and the pressure of the cathode gas detected by the sensor and the calculated target flow rate and the calculated target pressure;
    controlling the bypass valve on the basis of the flow rate of the cathode gas detected by the sensor and the calculated target flow rate; and
    increasing the pressure of the cathode gas to be supplied to the fuel cell by increasing a calculated at least one operation amount calculated when the bypass valve is opened during the controlling the bypass valve.

* * * * *